(12) United States Patent
Choi

(10) Patent No.: US 10,578,486 B2
(45) Date of Patent: Mar. 3, 2020

(54) METHOD OF CALIBRATING SPECTRUM SENSORS IN A MANUFACTURING ENVIRONMENT AND AN APPARATUS FOR EFFECTING THE SAME

(71) Applicant: NANOLAMBDA KOREA, Daejeong (KR)

(72) Inventor: Byung Il Choi, Pittsburgh, PA (US)

(73) Assignee: NANOLAMBDA KOREA, Daejeong (KR)

( * ) Notice: Subject to any disclaimer, the term of this patent is extended or adjusted under 35 U.S.C. 154(b) by 0 days.

(21) Appl. No.: 16/031,409

(22) Filed: Jul. 10, 2018

(65) Prior Publication Data

US 2019/0017871 A1      Jan. 17, 2019

Related U.S. Application Data

(60) Provisional application No. 62/531,462, filed on Jul. 12, 2017.

(51) Int. Cl.
| | |
|---|---|
| *G01J 3/02* | (2006.01) |
| *G01J 3/28* | (2006.01) |
| *G01J 3/18* | (2006.01) |
| *G01J 3/12* | (2006.01) |

(52) U.S. Cl.
CPC .......... *G01J 3/0254* (2013.01); *G01J 3/0213* (2013.01); *G01J 3/0218* (2013.01); *G01J 3/18* (2013.01); *G01J 3/2803* (2013.01); *G01J 3/2823* (2013.01); *G01J 2003/1208* (2013.01)

(58) Field of Classification Search
CPC ...... G01J 3/0254; G01J 3/0213; G01J 3/0218; G01J 3/18; G01J 3/2803; G01J 2003/1208
See application file for complete search history.

(56) References Cited

U.S. PATENT DOCUMENTS

| | | | |
|---|---|---|---|
| 6,504,976 B1* | 1/2003 | Polynkin | G01J 3/2803 385/15 |
| 8,284,401 B2* | 10/2012 | Choi | G01J 3/02 356/419 |
| 2002/0135770 A1* | 9/2002 | Lewis | G01J 3/26 356/419 |
| 2008/0130001 A1* | 6/2008 | Lewis | G01J 3/2823 356/419 |

* cited by examiner

*Primary Examiner* — Dominic J Bologna
(74) *Attorney, Agent, or Firm* — The Marbury Law Group, PLLC

(57) ABSTRACT

Spectrum sensors can be continuously calibrated in a manufacturing environment employing a continuously moving platform that carries the spectrum sensors in combination with spatially separated light spectra illuminating a region of the platform. A plurality of spectrum sensors, each including multiple sensor pixels, can be placed on the platform. The spatially separated light spectra can be illuminated over an area of the platform. The plurality of spectrum sensors can be moved with the platform through a region of the spatially separated light spectrum. Each sensor pixel for each of the plurality of spectrum sensors can be calibrated based on response of each spectral channel during passage through the spatially separated light spectra. The entire spectra from a light source can be employed simultaneously to calibrate multiple spectrum sensors in the manufacturing environment.

10 Claims, 19 Drawing Sheets

METHOD OF CALIBRATING SPECTRUM SENSORS IN A MANUFACTURING ENVIRONMENT AND AN APPARATUS FOR EFFECTING THE SAME

RELATED APPLICATIONS

This application claims benefit of priority of U.S. Provisional Application No. 62/531,462, filed Jul. 12, 2017, the entire contents of which is incorporated herein by reference.

FIELD

The present disclosure is directed to solid state spectrometers employing pixel-count-modulated channels to provide uniform detection sensitivity across a spectral range and methods of manufacturing the same.

BACKGROUND

Optically dispersive elements are well known in the art. Prisms and diffraction gratings are typical dispersive elements. Due to their superior dispersion properties, diffraction gratings are often used in modern spectrophotometers. The prism achieves dispersion due to the difference in the material refractive index according to the wavelength. However, the diffraction grating uses the difference in diffraction direction for each wavelength due to interference. Operating principles of the optically dispersive elements are available from various sources. An example of a website covering this topic is http://www.shimadzu.com/an/uv/support/fundamentals/monochromators.html, the entire contents of which are incorporated herein by reference.

A spectrometer, or a spectrum sensor, is an instrument configured to analyze the spectral distribution of impinging light. The spectrometer differs from imagers or cameras in that the spectrometer does not generate a spatial map of incoming light or a two-dimensional image at one or more (typically three) wavelength bands, but generates a spectral image of the entire impinging light without regard to spatial distribution of the intensity of light. The spectral image includes a set of intensity measurements for each wavelength range, which is herein referred to as a spectral channel or a "channel."

An "on-chip spectrometer" or a "spectrometer-on-chip" refers to a spectrometer employing a single chip on which semiconductor devices for measuring the intensity of light at a respective channel are mounted in parallel. The on-chip spectrometers differ from conventional spectrometers most prominently by the size. Typically, an on-chip spectrometer has a dimension less than 10 cm×10 cm×10 cm, such as less than 5 cm×5 cm×5 cm, and may weigh less than 200 g. This is a tremendous improvement in portability compared to conventional spectrometers, which typically have a dimension greater than 50 cm×50 cm×50 cm, and weigh at least 30 kg. The portability of the on-chip spectrometer is achieved by employing solid-state devices for each component of the spectrometer. Thus, a dispersive prism and a collimator in a conventional spectrometer is replaced by an array of band pass filters that allow passage of light only within the respective wavelength range, and an array of solid state detectors underlying the array of band pass filters. An example of such an on-chip spectrometer is described in U.S. Pat. No. 8,284,401 B2 to Choi et al. and U.S. Pat. No. 8,542,359 B2 to Choi et al, which are assigned to Nano-Lambda, Inc. as of 2017.

Optical spectroscopy allows complete characterization of the spectral distribution of light emanating from an object or an ambient. The information contained in the spectral distribution of light can be captured by a spectrometer, and can be used to detect and quantify the characteristics or concentration of a physical, chemical, or biological object. Spectroscopy is a non-destructive measurement. For example, optical diagnostics using spectroscopy allows acquisition of chemical and/or biological information without taking a physical specimen.

The sensitivity of each sensor pixel in an optical sensor or a spectrum sensor needs to be properly calibrated for an optical sensor or the spectrum sensor to function accurately. Calibrating each sensor pixel employing a single selected spectrum at a time is time-consuming and increases production cost. A method of employing a monochrometer to sequentially irradiate a single sensor with different incident wavelengths is known. In this case, a prism or a diffraction grating in the monochrometer rotates relative to the single sensor under calibration and only a small fraction of the light energy corresponding to the wavelength of choice at each moment is employed to calibrate the single sensor. Alternatively, a tunable light source emitting light with different wavelengths depending on the operational condition can be employed to calibrate a single sensor by varying the incident wavelength during the calibration process. Such methods can work in a lab environment, but do not provide sufficient throughput for mass manufacturing of spectrum sensors. Examples of websites covering this topic include: https://www.hamamatsu.com/resources/pdf/ssd/si_pd_kspd0001e.pdf for Si based Visual range, and https://www.hamamatsu.com/resources/pdf/ssd/infrared_kird9001e.pdf for IR range.

SUMMARY

The present disclosure provides methods and apparatuses for accurately calibrating sensor pixels of optical sensors or spectrum sensors in an efficient manufacturing environment.

According to an aspect of the present disclosure, a method of simultaneously measuring spectral responses of a plurality of optical sensors is provided, which comprises the steps of: placing a plurality of optical sensors on a platform; providing spatially separated light spectra over an illuminated region of the platform, wherein different areas of the illuminated region are illuminated with monochromatic light having different peak wavelengths; moving the plurality of spectrum sensors with the platform through the illuminated region; and measuring spectral responses of sensor pixels within each of the plurality of optical sensors or spectrum sensors during transit through the illuminated region.

According to another aspect of the present disclosure, an apparatus for calibrating a plurality of spectrum sensors is provided, which comprises: a platform configured to carry a plurality of optical sensors thereupon and to move along a movement direction; a light source emitting a beam of continuous light spectra; and an optically dispersive element located at a path of the beam of continuous light spectra and configured to generate spatially dispersed light spectra. Spatially separated light spectra are provided over an illuminated region of the platform. The spatially separated light spectra are the same as, or are derived through an optics system from, the spatially dispersed light spectra. Different areas of the illuminated region are illuminated with monochromatic lights having different peak wavelengths.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described with reference to the accompanying drawings. Elements are not drawn to scale. Wherever possible, the same reference numbers will be used throughout the drawings to refer to the same or like parts. References made to particular examples and implementations are for illustrative purposes, and are not intended to limit the scope of the invention or the claims.

Figure 1:
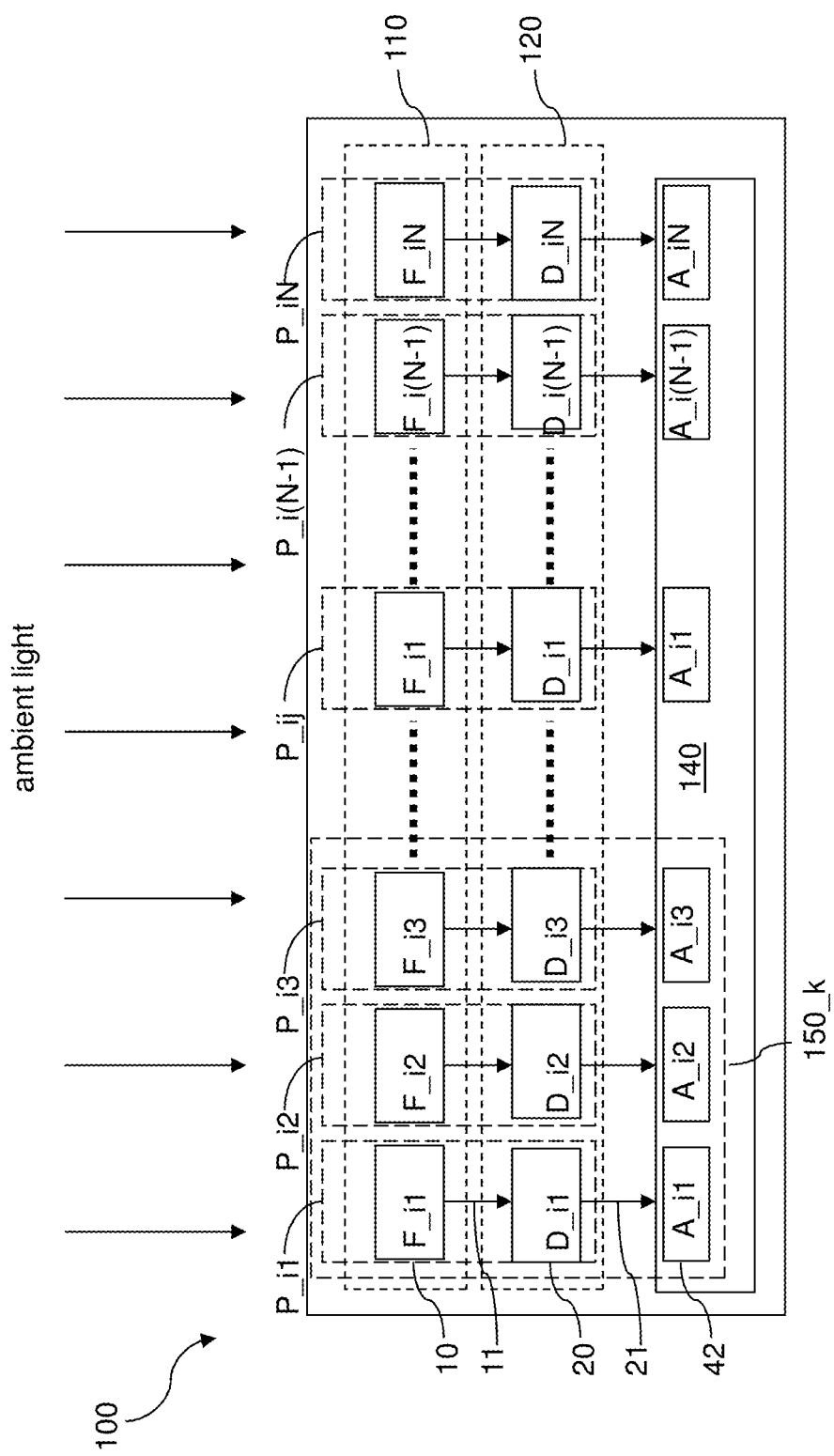
FIG. 1 is a schematic view of a sensor array and a signal processing unit of an exemplary spectrum sensor according to an embodiment of the present disclosure.
Figure 2:
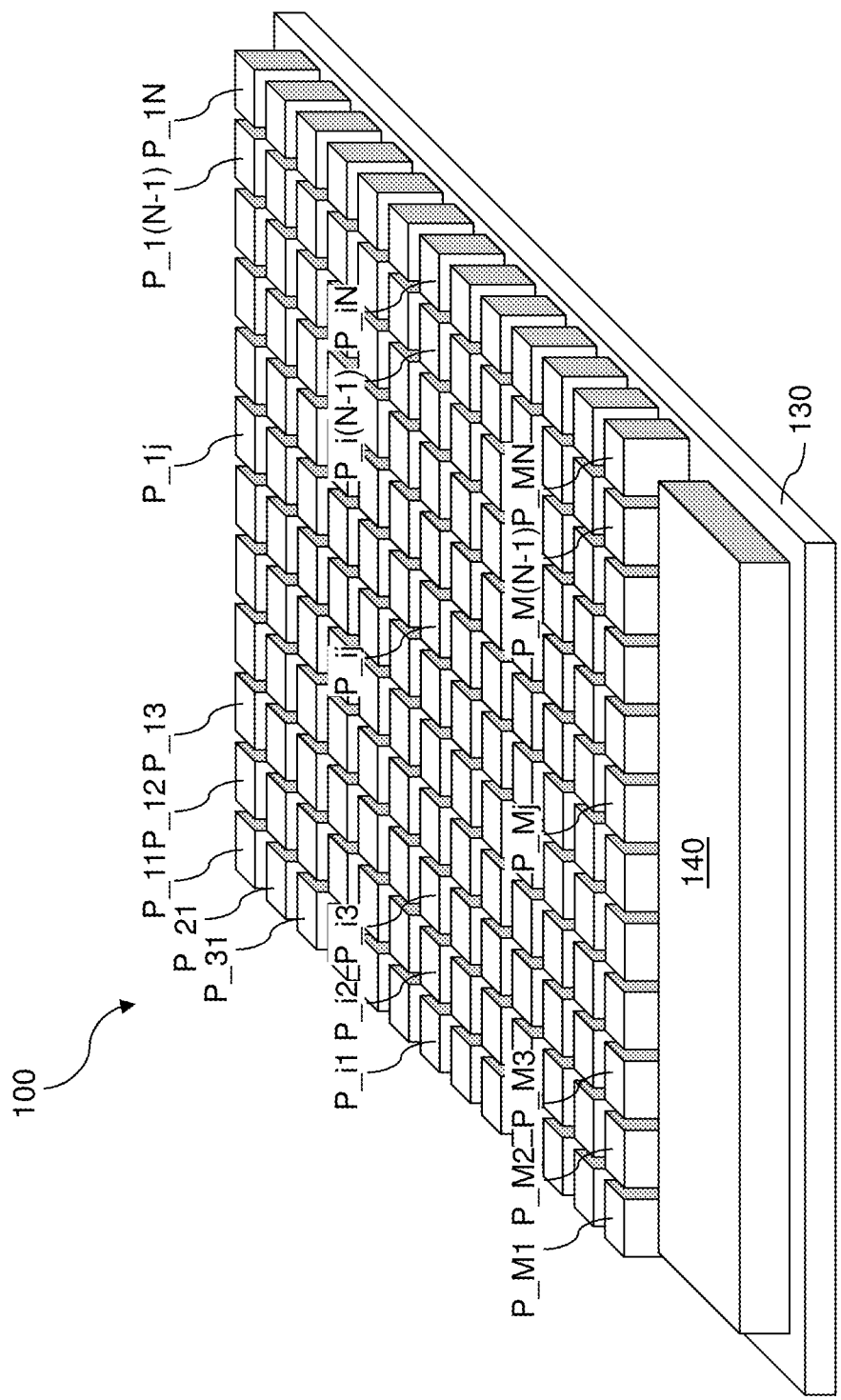
FIG. 2 is a perspective view of the sensor array and the signal processing unit of the exemplary spectrum sensor of FIG. 1.

Referring to FIGS. 1 and 2, a sensing unit 100 of an exemplary spectrum sensor is illustrated, which includes a sensor array and a signal processing unit 140. FIG. 1 is a schematic view and FIG. 2 is a perspective view of the sensing unit 100 of the exemplary spectrum sensor, which is an on-chip spectrum sensor. In one embodiment, the sensing unit 100 can be formed as a single semiconductor chip, which may be a silicon-based semiconductor chip or a III-V compound based semiconductor chip.

The sensing unit 100 can include a sensor array, which is an array of sensor pixels P_ij. In one embodiment, the array of sensor pixels P_ij can be in a configuration of a periodic two-dimensional array of sensor pixels P_ij. In one embodiment, the array of sensor pixels P_ij can be embodied as a rectangular M×N array of sensor pixels P_ij, in which the row index i runs from 1 to M, and the column index j runs from 1 to N. M and N are positive integers greater than 1. In one embodiment, M can be an integer greater than 3. In one embodiment, M may be in a range from 4 to 4,096, although lesser and greater positive numbers can be employed for M. N can be an integer greater than 3. In one embodiment, N may be in a range from 4 to 4,096, although lesser and greater positive numbers can be employed for N. For any pair of a fixed integer i and a fixed integer j, the sensor pixel P_ij refers to the sensor pixel located within the i-th row and within the j-th column. The set of all sensor pixels P_ij in which the integer i is a variable and the integer j is another variable forms the array of sensor pixels P_ij, which can have a total of M times N sensor pixels.

As used herein, a "sensor pixel" refers to a smallest device unit that can detect incident light and provide an output corresponding the intensity of the incident light. The array of sensor pixels P_ij can be located on a substrate 130. The substrate 300 can include metal interconnect structures such as metal lines and metal via structures therein. The metal interconnect structures within the substrate 300 can provide electrical connections between each sensor pixel P_ij and the circuitry within the signal processing unit 140. The signal processing unit 140 includes multiple spectral channels. As used herein, a "spectral channel" of a spectrometer refers to an electronic circuitry that provides a distinct electronic response (in the form of electrical current) as a function of input wavelengths. Thus, each spectral channel provides a distinct "spectral response curve," which is a wavelength-current curve that represents the magnitude of electrical current for input radiation of unit intensity at different wavelengths.

In one embodiment, each sensor pixel P_ij can include a stack of a respective photodetector 20 and a respective optical filter 10. Each optical filter 10 has a respective a transmission curve. As used herein, a "transmission curve" refers to the mathematical function that describes the transmission fraction of a monochromatic incident light as a function of wavelength. In one embodiment, each optical filter 10 belonging to different spectral channels can have different transmission curves, which can be effected by employing different designs for the optical filters 10 belonging to different spectral channels. Further, in case a spectral channel includes a plurality of sensor pixels therein, each optical filter 10 within the same spectral channel can have the same design, and therefore, the same transmission curve or substantially the same transmission curves (in which the difference among the transmission curves are insignificant and caused by variations in manufacturing processes).

In one embodiment, each optical filter 10 can be a plasmonic filter including a respective metal sheet and openings therethrough. Plasmonic filters are described in U.S. Pat. No. 8,284,401 B2 to Choi et al. and U.S. Pat. No. 8,542,359 B2 to Choi et al, the entire contents of which are incorporated by reference herein. In one embodiment, a plasmonic filter can include a metal or non-metal sheet with openings therethrough, particles, pillars, and/or wires provided that a plasmonic response can be generated upon illumination. Transmission curves for the optical filters 10 that employ plasmonic filters generally have multiple peaks and multiple valleys. Each optical filter 10 of the entire set of one or more sensor pixels for a spectral channel can have the same transmission curve by employing the same design for all of the plasmonic filter(s) within the spectral channel. The area of the optical filters 10 can be substantially the same across the optical filters 10, and can be substantially the same as the underlying photodetector 20. In one embodiment, the variations in the area of the optical filters can be less than 10% of the average area of the sensor pixels 10 within the array of sensor pixels. In this case, each sensor pixel 10 within the array of sensor pixels has a respective area within 90% and 110% of the average area of sensor pixels within the array of sensor pixels.

Each photodetector 20 can be a semiconductor photodetector based on silicon p-n junction or a p-n junction of a compound semiconductor material (such as gallium arsenide). A photodetector 20 located within the sensor pixel P_ij is herein referred to as a photodetector D_ij, i.e., a photodetector 20 located in the i-th row and in the j-th column. The photodetectors 20 can have the same design throughout the array of sensor pixels P_ij. In this case, the photodetectors 20 can constitute a two-dimensional M×N array of instances of a same photodetector design. In this case, each photodetector 20 can have the same area. The transfer characteristic, or the "sensitivity curve" of the photodetectors 20 can be the same across all the photodetectors 20 within the array of sensor pixels. The transfer characteristic of a photodetector 20 refers to the ratio of the electrical current output for a monochromatic irradiation of a unit intensity as a function of wavelength.

The effectiveness of a monochromatic light that impinges on a photodetector 20 in generating photoelectrons is referred to as the sensitivity of the photodetector 20. In other words, the sensitivity of a photodetector 20 is the ratio of the generated photoelectric current to the intensity of a monochromatic light that impinges on the photodetector. The sensitivity of a photodetector 20 thus depends on the wavelength of the incident monochromatic light, and thus, is a function of the wavelength of the incident radiation. This function is referred to as a "sensitivity curve" of the photodetector 20.

Within each sensor pixel P_ij, the optical filter 10 modifies the spectral distribution of incident light by the respective transmission curve and passes the filtered light 11 (which is an attenuated light spectrum) to the underlying photodetector 20. Each optical filter 20 belonging to the same spectral channel can have the same optical transmission curve. The filtered light 11 that passes through the overlying optical filter 10 impinges on the underlying photodetector 20, which generates a respective detection signal 21 that is in the form of photoelectric current. The photoelectric current from each sensor pixel is proportional to the integral of the product of a first function representing the intensity distribution of incident light spectrum onto the optical filter 10, a second function representing the transmission curve of the optical filter 10, and a third function representing the sensitivity curve (the transfer characteristic) of the photodetector 20 over the entire wavelength range of the incident light that impinges on the optical filter 10.

Each photoelectric current generated from the photodetectors 20 can be amplified by a respective signal amplifier 42. For example, the photoelectric current generated from the photodetector D_ij can be amplified by the underlying signal amplifier A_ij located within the signal processing unit 140.

The product of the second function representing the transmission curve of the optical filter 10 and the third function representing the sensitivity curve of the photodetector 20 defines the transfer characteristic of the corresponding sensor pixel, which is herein referred to as a spectral response curve. The integral of the product of the second function representing the transmission curve of the optical filter 10 and the third function representing the sensitivity curve of the photodetector 20 over the entire wavelength range of the sensing unit 100 defines the detection efficiency of the corresponding sensor pixel. The detection efficiency is a measure of effectiveness of a sensor pixel as averaged over the entire wavelength range of the sensing unit.

The spectral response curve of a sensor pixel represents the sensitivity of the sensor pixel as a function of the wavelength. The spectral response curve of each spectral channel represents the sensitivity of the spectral channel as a function of the wavelength, i.e., the magnitude of photoelectron-induced current per unit intensity of radiation at each wavelength. The entire wavelength range can include a range, for example, from 150 nm to 3,000 nm, from 200 nm to 2,500 nm, from 250 nm to 1,100 nm, and/or 400 nm to 800 nm, and generally corresponds to the entire measurement range of the sensor pixel. In case a spectral channel includes a plurality of sensor pixels, the spectral response curve of the spectral channel is the sum of all spectral response curves of the plurality of sensor pixels. In case the sensor pixels within the same spectral channel have the same, or substantially the same, spectral response curve, the spectral response curve of the spectral channel can be the same as, or substantially the same as, the product of the spectral response of a sensor pixel therein and the total number of sensor pixels within the spectral channel.

Each spectral channels of the sensing unit 100 may include a single sensor pixel, or may include a plurality of sensor pixels. In one embodiment, the M×N sensor pixels P_ij can be grouped into L spectral channels 150_k, in which the positive integer index k runs from 1 to L. FIG. 1 illustrates a case in which the k-th spectral channel 150_k happens to include three sensor pixels. The number L can be the same as M×N, or may be smaller than M×N. In some embodiment, some of the sensor pixels may be dark pixels that do not include an associated spectral channel, but are employed to estimate the electronic noise from the photodetectors 20. In one embodiment, the design for the optical filter 10 can be the same among all of the optical filters 10 within the same spectral channel in case the spectral channel includes multiple sensor pixels, and the spectral response curve can be the same, or substantially the same (within the limit imposed by variations during manufacturing), across the sensor pixels within the same spectral channel.

In one embodiment, each photodetector 20 in the array of sensor pixels can include a same semiconductor material (such as silicon or a III-V compound semiconductor material) having the same photosensitive junction structure and has the same device area. In one embodiment, the multiple spectral channels can include L spectral channels, which can be at least 16 spectral channels having different transmission curves. In one embodiment, for each integer k from 1 to L, a k-th spectral channel receives an output signal from each sensor pixel including an optical filter having a k-th transmission curve.

The output from the signal amplifiers of each spectral channel can be added to generate an output for the spectral channel. The spectral response curve of each spectral channel can be determined by sequentially irradiating monochromatic light of known intensity and known wavelength at each wavelength at which the spectral channel is characterized. As used herein, "monochromatic light" refers to light having a sufficiently narrow wavelength range such that the wavelength range is less than 25 nm. For practical purposes, the monochromatic light employed for the present invention needs to have sufficiently narrow wavelength to provide significantly different responses among the L different types of optical filters. For some applications, monochromatic light employed for the purposes of the present disclosure can have a wavelength range less than 10 nm, or even less than 5 nm. If the sensing unit 100 includes L spectral channels (L being greater than 80) covering the visible spectrum, the width of the monochromatic light can be on the order of 5×(800 nm–400 nm)/L or less.

Figure 3:
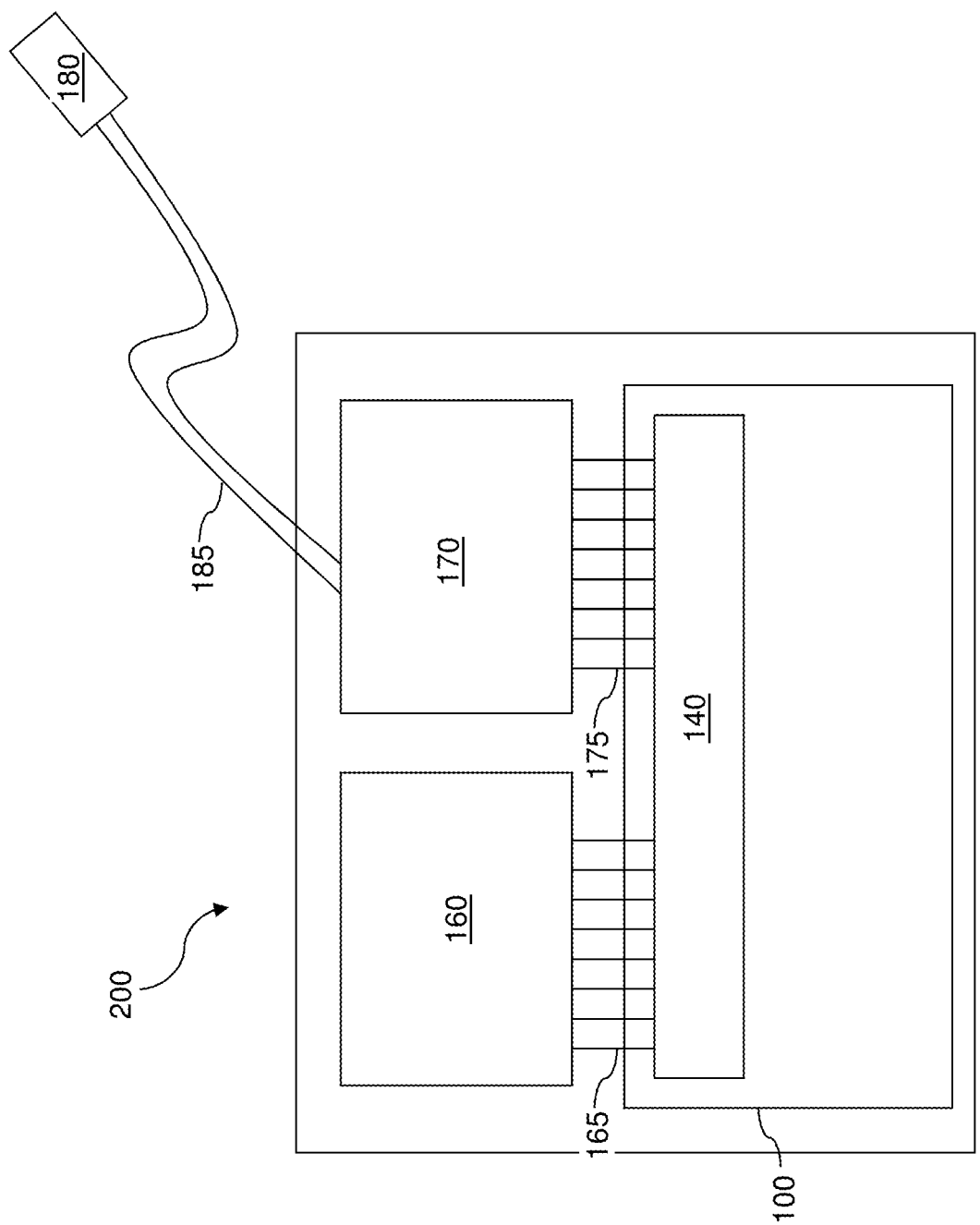
FIG. 3 is a schematic view of the exemplary spectrum sensor of FIGS. 1 and 2.

FIG. 3 illustrates a spectrum sensor 200, which includes a sensor unit 100 as described above, an optional memory 160 in communication with the sensor unit 100 via a first signal bus 165, and a program controller 170 in communication with the sensor unit 100 via a second signal bus 175. The program controller 170 can be configured to communicate with an external electronic device (such as a cellular phone or a personal computer that is optionally configured with a control and/or display program) through a connector 180 and a connection cable 185.

The memory 160, if present, can store data for the spectral response curves of each of the sensor pixels P_ij. For example, the spectral response curves of each sensor pixel may be stored in the memory 160 in a matrix form. According to an embodiment of the present disclosure, the spectral response curves of each spectral channel may be stored in the memory 160.

According to an aspect of the present disclosure, each spectral measurement can generate a vector including as many components as the total number of spectral channels, i.e., L components. Each of the L components represents the measured intensity of light in the corresponding one of the L spectral channels of the sensing unit 100. In this case, calculation of the spectral distribution of the incident light that generated the vector of L components becomes a mathematical problem of solving a matrix equation M=TI, in which M represents the L-dimensional vector representing the measured outputs from the L spectral channels, T represents the matrix characterizing the L spectral response curves of the L spectral channels, and I represents the vector representing the unknown spectral distribution of the incident light.

Algorithm for solution for this type of problem is described in U.S. Pat. No. 9,395,244 B2 to Kurokawa et al., U.S. Pat. No. 8,284,401 B2 to Choi et al., and U.S. Pat. No. 8,542,359 B2 to Choi et al, the entire contents of which are incorporated herein by reference. The program controller 170 can be loaded with a program that solves the matrix equation based on the data for the spectral response curves of the spectral channels of the sensing unit 100. The connection cable 185 and the connector 180 can be employed to display the solution for the solution for the vector I in a graphical format, which may be a curve showing the estimated spectral composition of the measured incident light.

Alternatively, the data for the spectral response curves of the spectral channels of the sensing unit 100 and/or the program that solves the matrix equation may be saved in a stand-alone computer or in at least one cloud server. In this case, the identification number for the sensing unit 100 can also be stored along with the data for the spectral response curves of the spectral channels of the sensing unit 100 to ensure that the correct dataset is employed for each calculation of the vector representing the unknown spectral distribution of the incident light.

Generally, the optical filters 10 can be designed to provide transmission curves providing an integrated transmission of about the same magnitude. As used herein, an "integrated transmission" refers to the integral of a transmission curve over the entire wavelength range of the sensing unit 100. In this case, a low sensitivity of the photodetector 20 within the wavelength range including the peak regions of the transmission curve of an overlying optical filter 10 results in low detection efficiency for the sensor pixel including the optical filter 10 and the photodetector 20. Thus, the sensitivity curve of the photodetectors 20 has a direct impact on the magnitude of the electronic signal generated from each sensor pixel.

Figure 4:
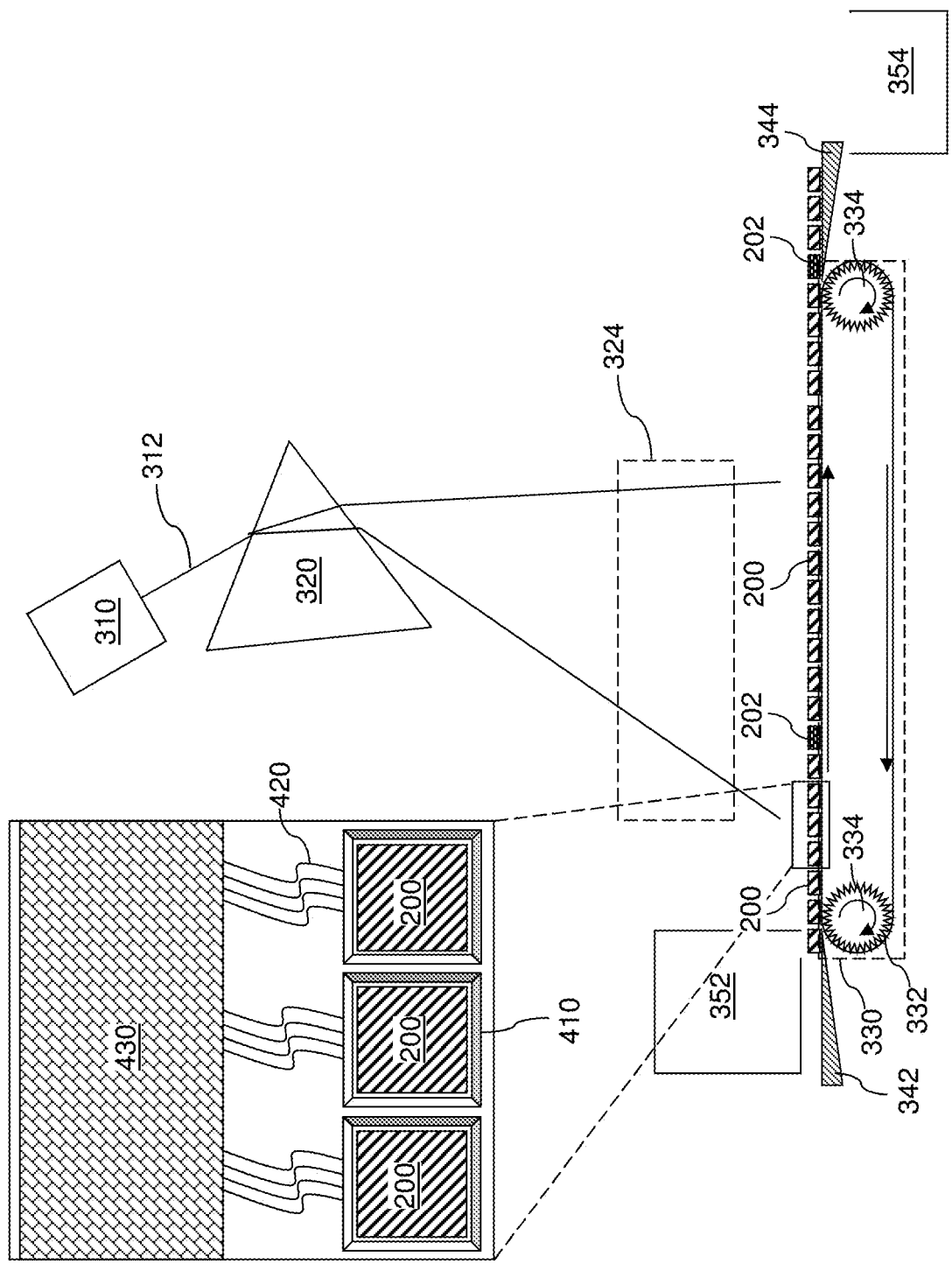
FIG. 4 is a schematic view of a first exemplary sensor spectral response measurement apparatus according to an embodiment of the present disclosure.

Referring to FIG. 4, and according to an aspect of the present disclosure, a first exemplary sensor spectral response measurement apparatus is shown, which can be employed to simultaneously measure spectral responses of a plurality of spectrum sensors 200. The plurality of spectrum sensors 200 can be any of the spectrum sensors described above, or may be any other on-chip spectrum sensor known in the art. Each of the plurality of spectrum sensors 100 includes a plurality of sensor pixels. In some embodiments, each optical filter can be a plasmonic filter including a respective metal sheet and openings therethrough. The array of sensor pixels can be arranged as a rectangular M×N array of sensor pixels such that M is an integer in a range from 4 to 4,096, and N is an integer in a range from 4 to 4,096.

The plurality of spectrum sensors 200 can be placed on a platform 330 that is configured to provide a movement along a movement direction. For example, the platform 330 may comprise a conveyor belt configured to provide a linear movement along a horizontal direction. The conveyor belt may be actuated by at least one driver mechanism, which can include, for example, at least one gear 334 engaged to a set of matching grooves on the inside of the conveyer belt and driven by a controlled motor (not shown).

Optionally, an array of sensor mount sockets 410 (shown within an inset of FIG. 4 in a plan view) may be located on the platform 330, and can be configured to mount the plurality of spectrum sensors 200 thereupon. The sensor mount sockets 410 can provide electrical interfaces between each of the plurality of spectrum sensors 200 and data transmission hardware 410 that are connected to the sensor mount sockets 410. In one embodiment, the data transmission hardware 410 can be embodied as cables that are configured to provide data transmission from the plurality of spectrum sensors 200 to a data storage unit 430. The data storage unit 430 can be configured to run a data storage program that stores spectral response curves as generated from the plurality of spectrum sensors 200. In one embodiment, tangling of the cables 410 can be avoided by periodically adjusting the connections provided by the cables. Alternatively, the data transmission hardware 410 can include wireless data transmission devices located on the sensor mount sockets 410 and on the data storage unit 430. Use of the data transmission hardware can avoid tangling of cables during continuous movement of the platform 330.

A feeder bin 352 including uncalibrated spectrum sensors 200 can be provided. The feeder bin 352 can be configured to automatically feed additional spectrum sensors 200 onto the platform 330, for example, by placing the additional spectrum sensors 200 into the array of sensor mount sockets 410 one at a time. A feeder guide 342 can be employed to guide the placement of the uncalibrated spectrum sensors 200 into a respective one of the sensor mount sockets 410. The feeder bin 352 and the optional feeder guide 342 enables the continuous feeding of additional spectrum sensors 200 at a feeding end of the platform 300 (which may be embodied as a conveyor belt).

The spectrum sensors 200 can be collected at an exit end of the platform 330, for example in a collection bin 354 at a collecting end of the platform 330 (which can be a collecting end of a conveyer belt). A collection guide 344 can be provided to facilitate disengagement of the spectrum sensors 200 from the sensor mount sockets 410.

In one embodiment, reference sensors 202 can be placed intermittently in lieu of a small percentage of spectrum sensors 200 to monitor stability of the light spectra that impinge on the sensor pixels 200 during continuous operation of the sensor spectral response measurement apparatus. The reference sensors 202 are optical sensors having known spectral response curves. If the light spectra are stable, the reference sensors 202 reproduce the same spectral response curve run over run. If the light spectra significantly changes, the sensor spectral response measurement apparatus can be repaired to produce stable light spectra. If the intensity of light spectra changes to a degree that can be compensated by modification of the spectral response curves (for example, by multiplying a modifier scalar), such modification can be performed by analyzing the measured spectral response curves of the reference sensors 202.

Spatially separated light spectra 324 are provided over an illuminated region of the platform 330. As used herein, "spatially separated light spectra" refers to light spectra that have different wavelengths in different regions that are spatially spaced from one another along the direction perpendicular to the direction of illumination. In one embodiment, the spatially separated light spectra 324 can be monochromatic in each area of the illumination region such that each illuminated area has a distinct wavelength. In other words, different areas of the illuminated region are illuminated with monochromatic light having different peak wavelengths.

In one embodiment, the spatially separated light spectra 324 include an entirety of a wavelength range from 400 nm to 800 nm. In one embodiment, the plurality of spectrum sensors 200 can pass through the illuminated region with a uniform speed. In one embodiment, each location of illumination can have a unique peak wavelength. In this case, the range of the wavelength of the monochromatic light can continuously vary from one side to another side of the illumination region.

In one embodiment, the spatially separated light spectra 324 can be generated at least by generating a collimated light 312 from a light source 310 that can include a collimator therein, and by generating spatially dispersed light spectra employing an optically dispersive element 320. The optically dispersive element 320 can include a spatially dispersive transparent medium (such as an optical prism) and/or any other refractive optical element, and may include reflective optical elements (such as a mirror). As used herein, a "spatially dispersive transparent medium" refers to a transparent medium providing different indices of refraction for different wavelengths. The spatially separated light spectra 324 are provided from respective segments of the spatially dispersed light spectra.

In one embodiment, the spatially dispersed light spectra from the optically dispersive element 320 can be directed toward the platform 330 as the spatially separated light spectra 324. In one embodiment, the spatially separated light spectra 324 can have a continuously varying wavelength along the movement direction of the plurality of spectrum sensors 200 over the platform 330.

The simultaneous measurement of the spectral responses of the plurality of spectrum sensors 200 on the platform 330 can be performed by moving the plurality of spectrum sensors 200 with the platform 330 through the illuminated region. The simultaneous measurement of the spectral responses of the plurality of spectrum sensors 200 may be performed while the spectrum sensors 200 are moving at a uniform speed. Alternatively, for improved accuracy of sensor calibration, the movement of the plurality of spectral sensors 200 may be stopped intermittently when the plurality of spectral sensors 200 arrive at predetermined measurement locations, and the simultaneous measurement of the spectral responses of the plurality of spectrum sensors 200 may be performed while the plurality of spectrum sensors 200 remain stationary. In this case, the duration of each calibration step can be prolonged to ensure that sufficient illumination is provided for calibration of each spectrum sensor 200. This mode of calibration is herein referred to as a "go and stop" calibration mode.

The wavelength counter for each spectrum sensor 200 and the wavelength of the illuminating spectrum among the spatially separated light spectra 324 are synchronized while the plurality of spectrum sensors 200 moves through the illumination region. The wavelength counter can be located within the program controller 170 of each spectrum sensor 200. The wavelength counter can be derived from a timer that is built into the program controller 170. The program that calculates the value of the wavelength counter can employ a predetermined table that tabulates the wavelength of the segment of the spatially separated light spectra 324 as a function of elapsed time from the moment of passage of the spectrum sensor 200 through a predetermined fixed point in space, which may be the location at which the spectrum sensor 200 is mounted onto a sensor mount socket 410. For example, the synchronization of the wavelength counter for each spectrum sensor 200 and the wavelength of the illuminating spectrum can be effected by providing a uniform speed of movement for the plurality of spectrum sensors 200 (for example, by providing a uniform rate of movement for the conveyer belt) and by resetting a clock for each of the plurality of spectrum sensors 200 at a time of transit through a fixed point before the illumination region.

The spectral responses of sensor pixels 200 within each of the plurality of spectrum sensors 200 can be measured during passage through the illuminated region. For example, for each spectrum sensor 200 among the plurality of spectrum sensors 200, a spectral response curve can be measured for each sensor pixel (and thus, for each spectral channel by summing the spectral response curves of the corresponding sensor pixels) within the array of sensor pixels as a function of wavelength while the respective spectrum sensor 200 moves through the illuminated region. Further, for each spectrum sensor 200 among the plurality of spectrum sensors 200, the spectral response curves for each sensor pixel can be stored in the data storage unit 430 through signal connections (wired or wireless) including a sensor mount socket 410 and communication hardware 420.

Figure 5:
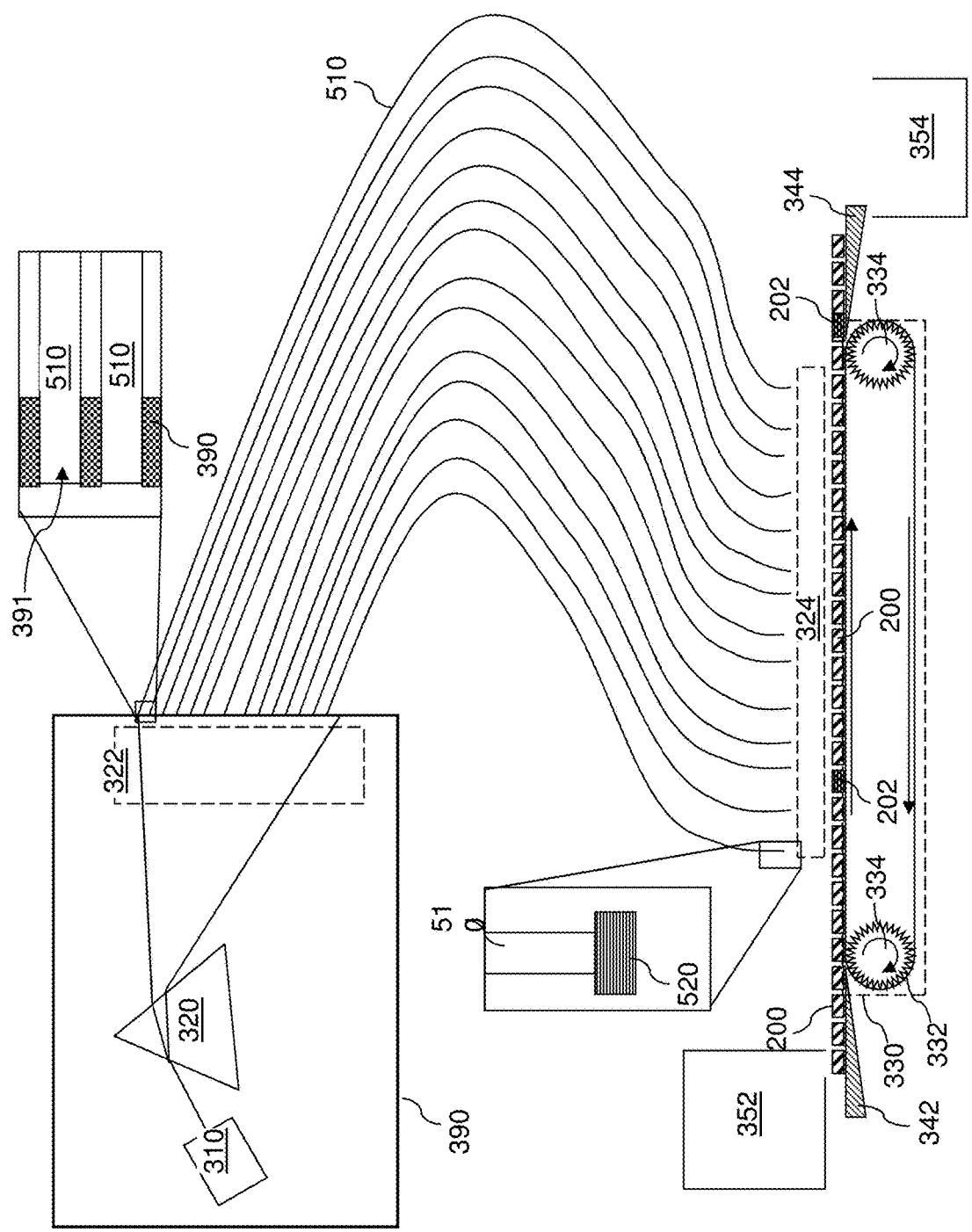
FIG. 5 is a schematic view of a second exemplary sensor spectral response measurement apparatus according to an embodiment of the present disclosure.

Referring to FIG. 5, a second exemplary sensor spectral response measurement apparatus according to an embodiment of the present disclosure is illustrated, which can be derived from the first exemplary sensor spectral response measurement apparatus by employing fiberglass optical cables 510 to provide the spatially dispersed light spectra 322.

In this case, the optically dispersive element 320 can be is encased in an enclosure 390 including a plurality of openings 391 at locations to which the spatially dispersed light spectra 322 are directed. The fiberglass optical cables 510 can be optically coupled to a respective segment of the spatially dispersed light spectra 322 through the openings 391 in the enclosure 390.

Figure 6A:
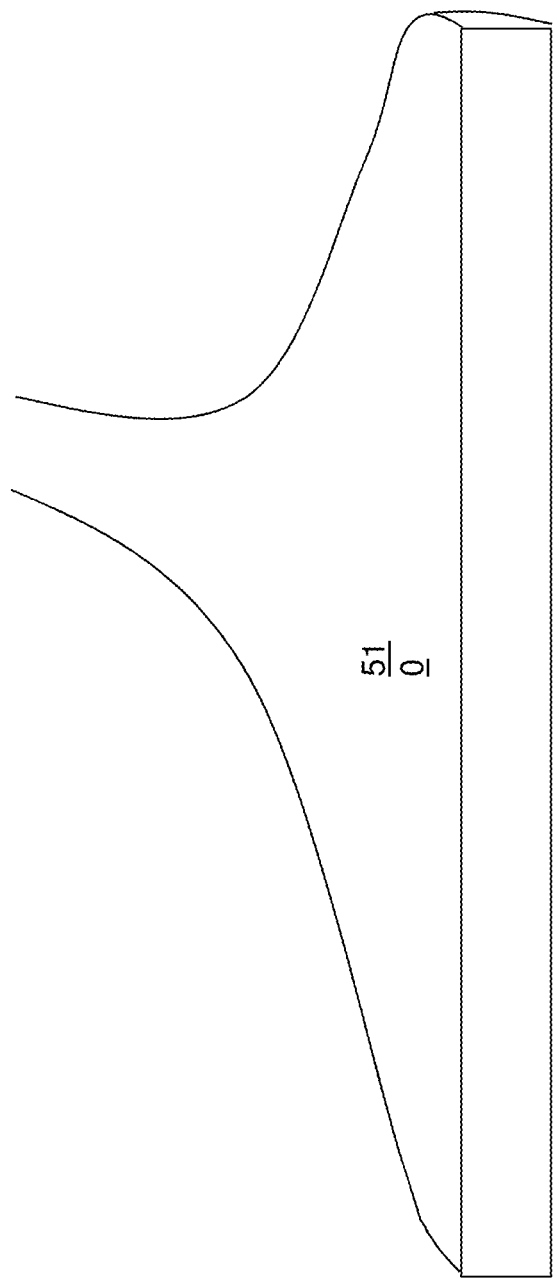
FIG. 6A is a perspective view of a reception end of a first exemplary fiberoptic cable for the second exemplary sensor spectral response measurement apparatus according to an embodiment of the present disclosure.
Figure 6B:
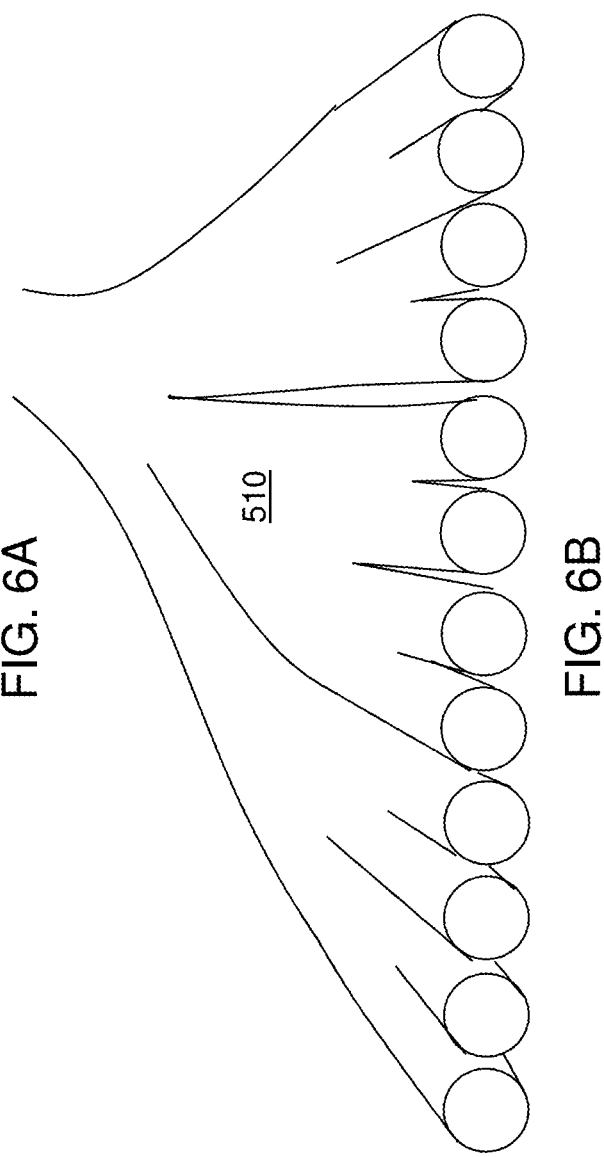
FIG. 6B is a perspective view of a reception end of a second exemplary fiberoptic cable for the second exemplary sensor spectral response measurement apparatus according to an embodiment of the present disclosure.

Referring to FIGS. 6A and 6B, the connecting ends of the fiberglass optical cables 510 can be configured to fit the openings 391 in the enclosure 390. If the openings 391 have slit shapes, the input ends of the fiberglass optical cables 510 can have a matching slit shape as illustrated in FIG. 6A. If the openings 391 have an array of circular or elliptical shapes, the connecting ends of the fiberglass optical cables 510 can have a branching configuration and matching end portions to fit a row of openings having circular or elliptical shapes. Each fiberglass optical cable 510 can have suitable configuration to guide the light that enters the input end to an exit end of the fiberglass optical cable 510.

Referring back to FIG. 5, the segments of the spatially dispersed light spectra 322 that are captured into the input ends of the fiberglass optical cables 510 can be guided through fiberglass optical cables 510 such that exit ends of the fiberglass optical cables 510 are positioned over the platform 330 and are directed toward the plurality of spectrum sensors 200. The spectra that is illuminated toward the plurality of spectrum sensors 200 constitutes a spatially separated light spectra 324, which is different from, and is derived from, the spatially dispersed light spectra 322.

In one embodiment, the spatially separated light spectra 324 can include at least 16 distinct light spectra having different peak wavelengths. In one embodiment, each of the spatially separated light spectra 324 can have a respective minimum wavelength and a respective maximum wavelength that is greater than the respective minimum wavelength by no more than 25 nm. In other words, the range of wavelength of each spectrum that exits the exit ends of the fiberglass optical cables 510 can be less than 25 nm. The peak wavelengths of the spatially separated light spectra 324 may, or may not, be ordered along the movement direction. In other words, the peak wavelengths of the spatially separated light spectra 324 may, or may not, be a strictly increasing function or a strictly decreasing function of the lateral distance along the platform 330. In one embodiment, there may be a gap (i.e., an unilluminated area) within the illustration region that provides the spatially separated light spectra 324.

According to an aspect of the present disclosure, a light attenuating filter 520 (shown in an inset of FIG. 5 in a vertical cross-sectional view) can be optionally attached to a subset of the fiberglass optical cables 510 at respective exit ends. Such light attenuating filter 520 can provide suitable attenuation of light only for the light exiting the respective fiberglass optical cable 510. Thus, it is possible to selectively attenuate only a subset of the spectra among the spatially separated light spectra 324 so that the intensity of the spatially separated light spectra 324 can be substantially uniform across the entire wavelength range of the spatially separated light spectra 324. This feature can be advantageous because calibration of the sensitivity curves of the sensor pixels as a function of the wavelength can be facilitated by providing light of about the same intensity across the entire calibration wavelength range.

Figure 7:
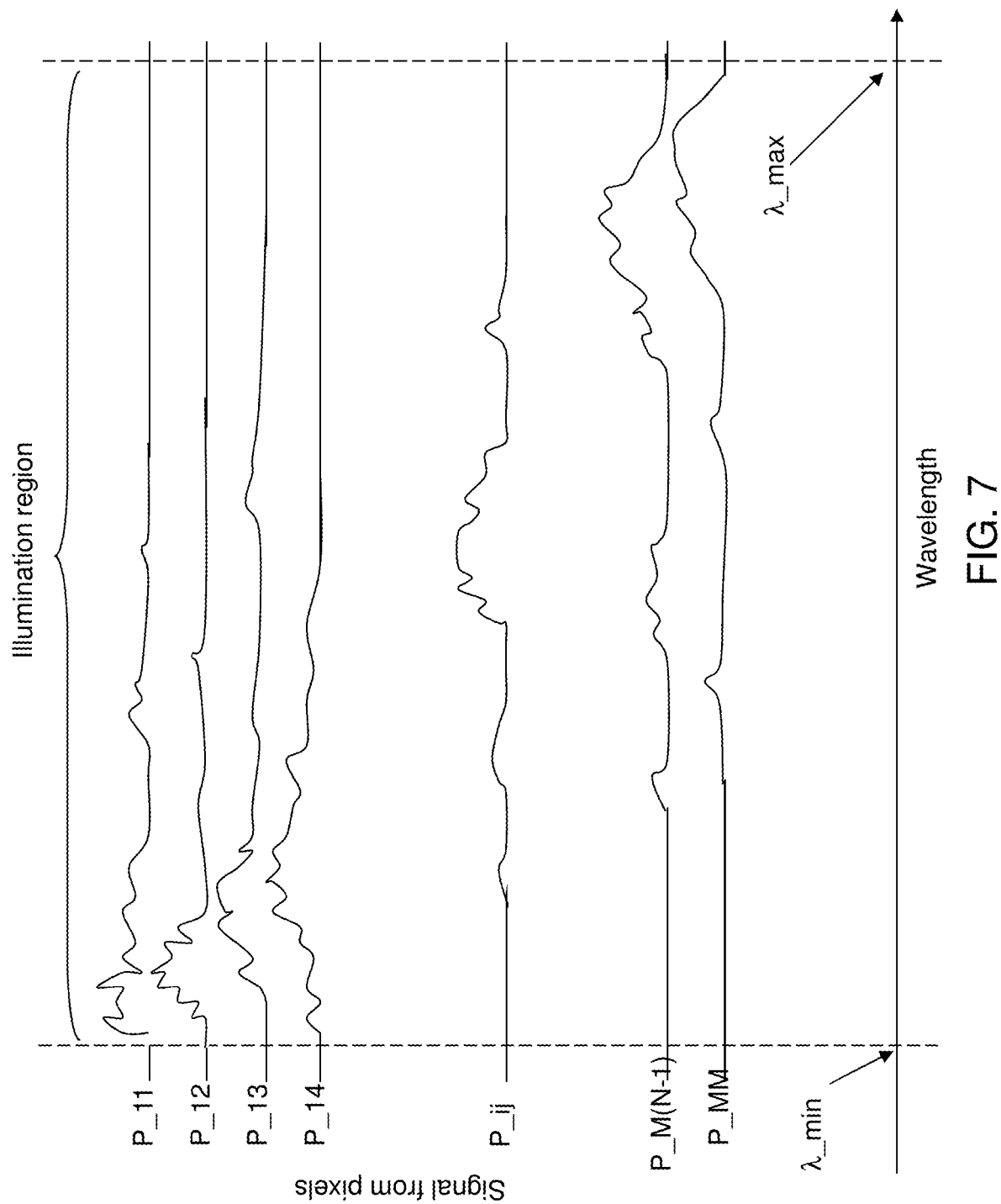
FIG. 7 is a schematic illustration of an exemplary set of spectral response curves for a spectrum sensor according to an embodiment of the present disclosure.
Figure 8A:
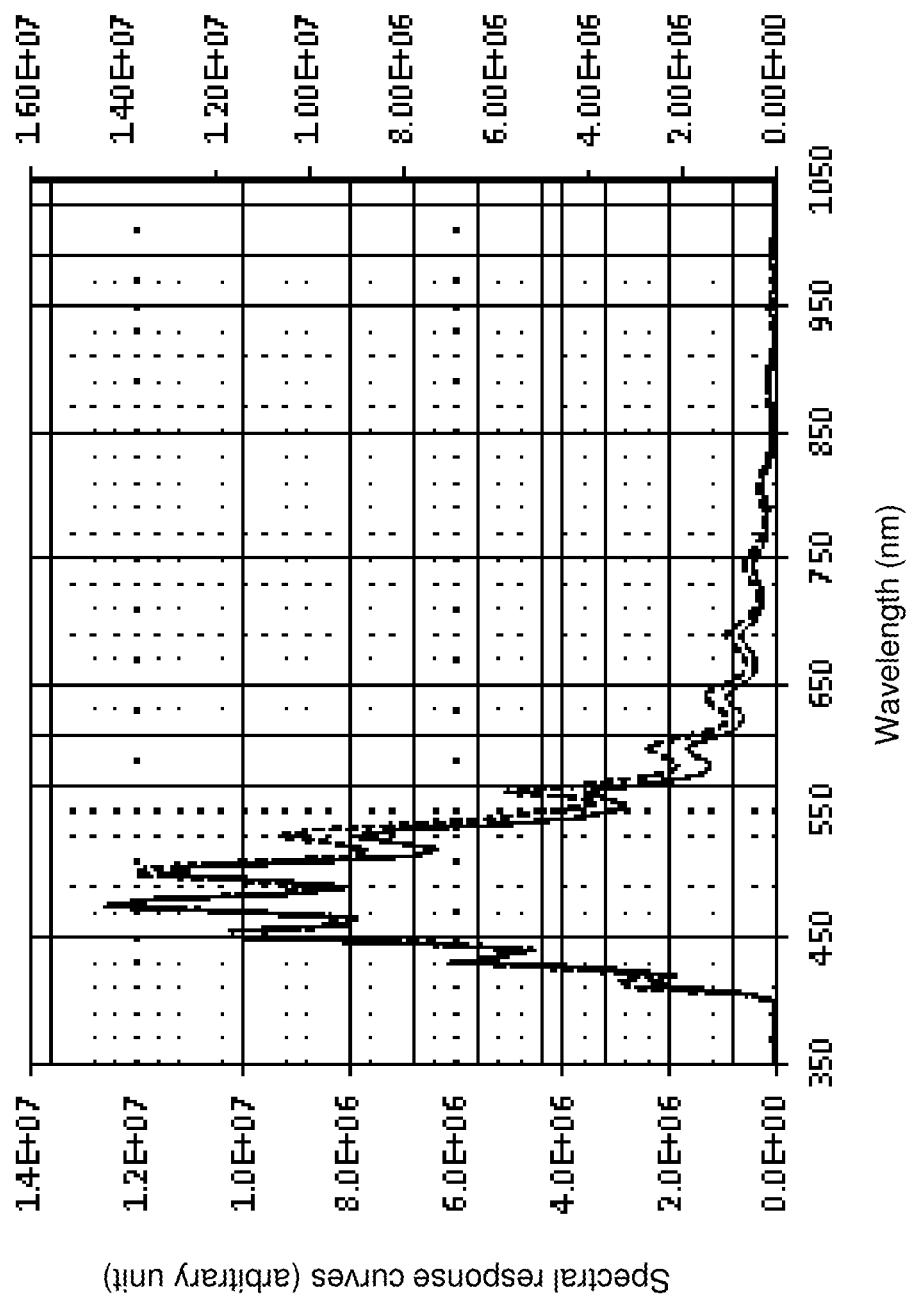
FIGS. 8A-8F are exemplary measured spectral response curves from sensor pixels of a of a sample spectral imager.
Figure 8B:
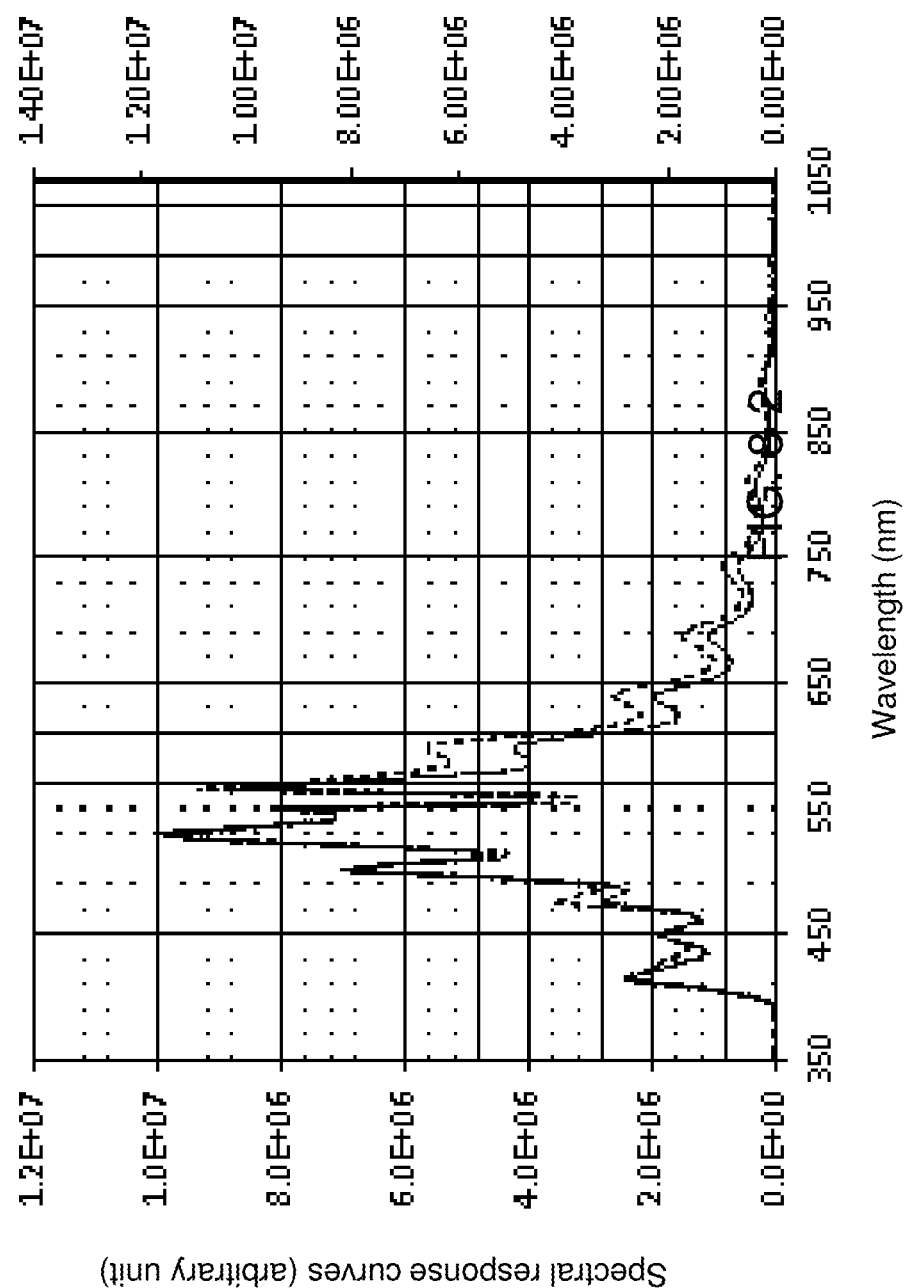
Figure 8C:
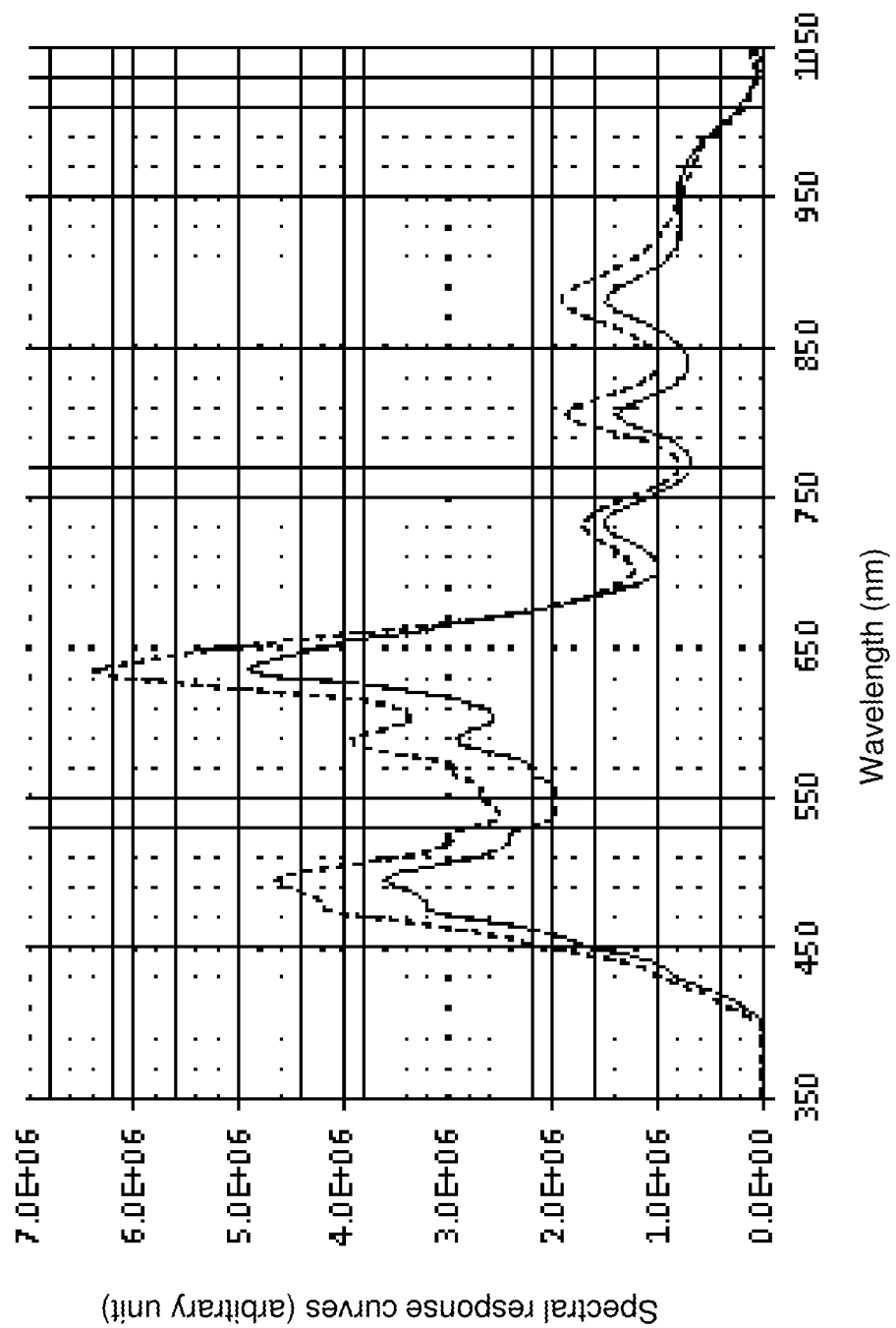
Figure 8D:
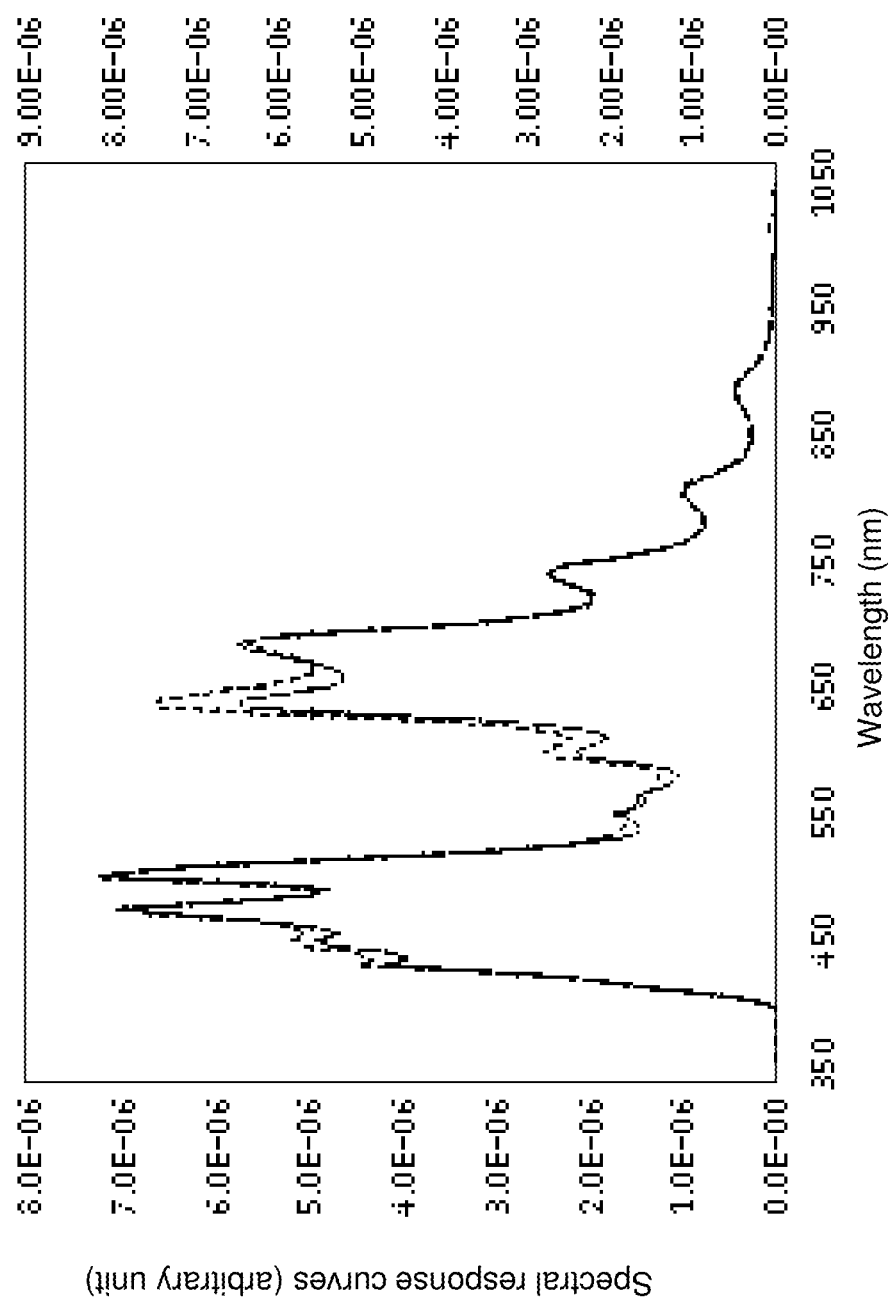
Figure 8E:
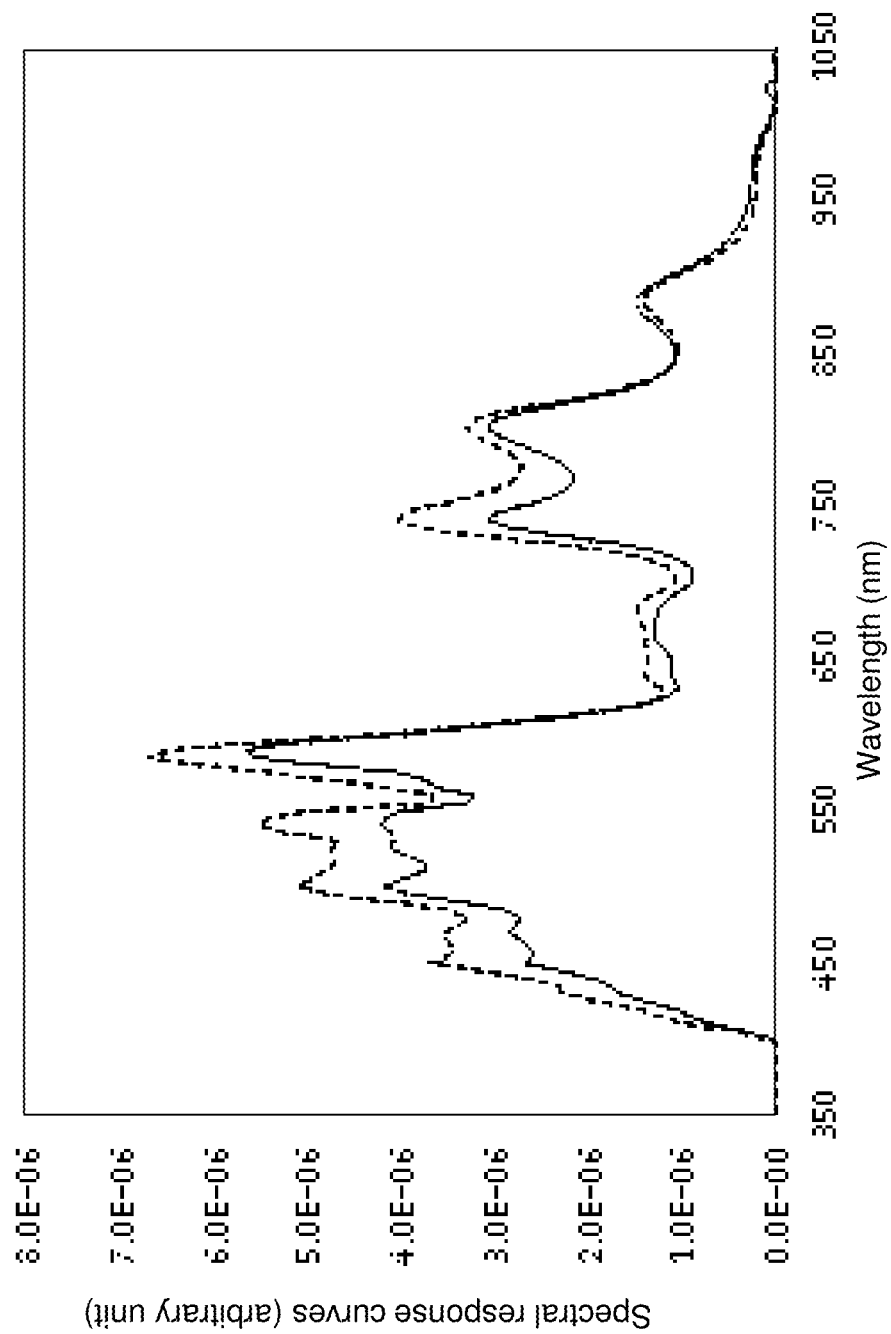
Figure 8F:
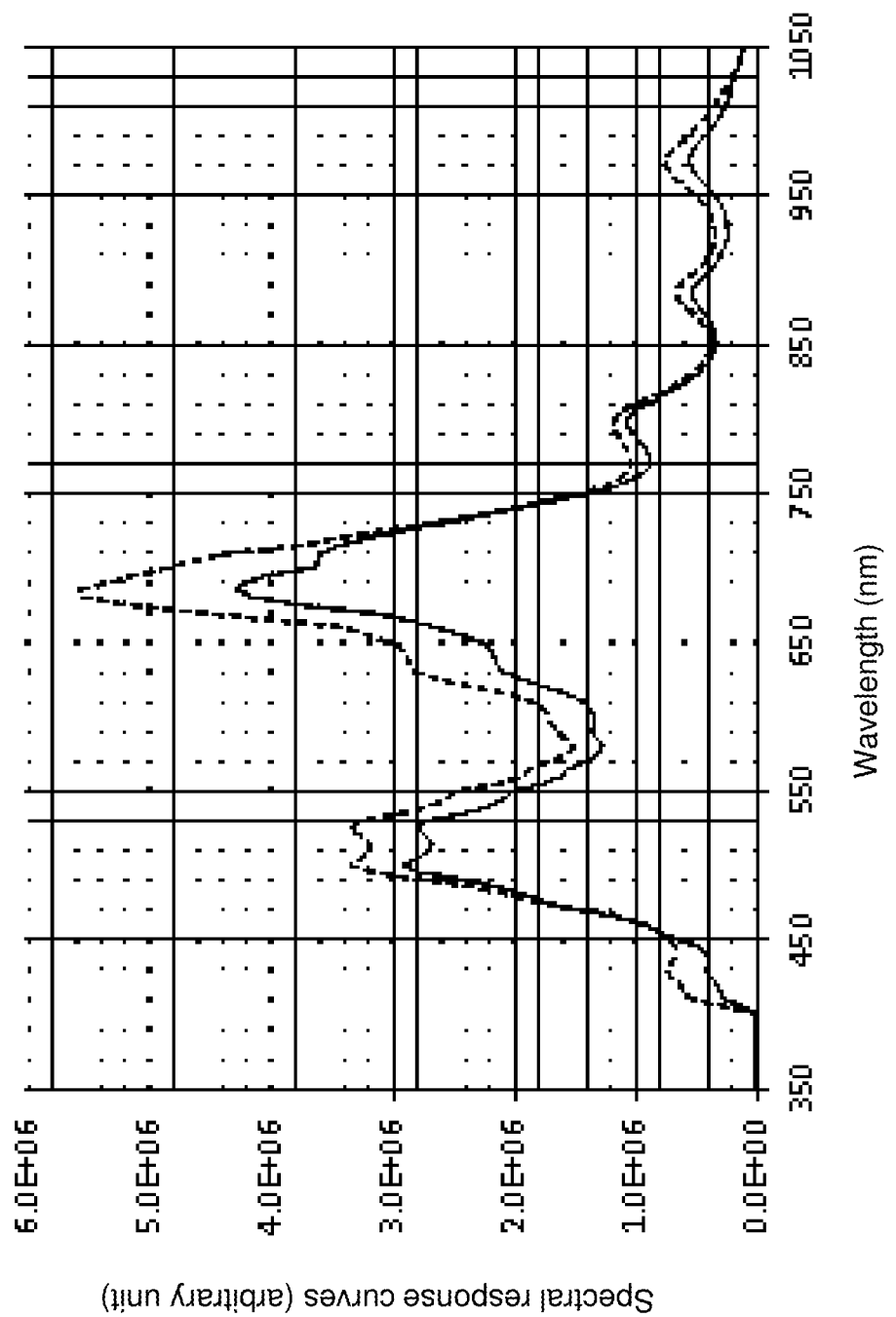

Referring to FIG. 7, exemplary signals from pixels are illustrated as a function of wavelength. Each wavelength corresponds to a location within a sensor spectral response measurement apparatus that is irradiated by the spectrum of the wavelength. Thus, there is a one-to-one correspondence between the irradiation locations in the sensor spectral response measurement apparatus and the wavelength of the spectral radiation. Each sensor pixel P_ij accumulates data (in terms of photoelectric current) as the sensor pixel travels through the irradiation region. Thus, each spectrum sensor 200 can generate a complete set of spectral response curves for the entire spectral channels (and/or for the entire set of sensor pixels) during passage through the illumination region.

FIGS. 8A-8F are exemplary measured spectral response curves from sensor pixels of a of a sample spectral imager.

Figure 9:
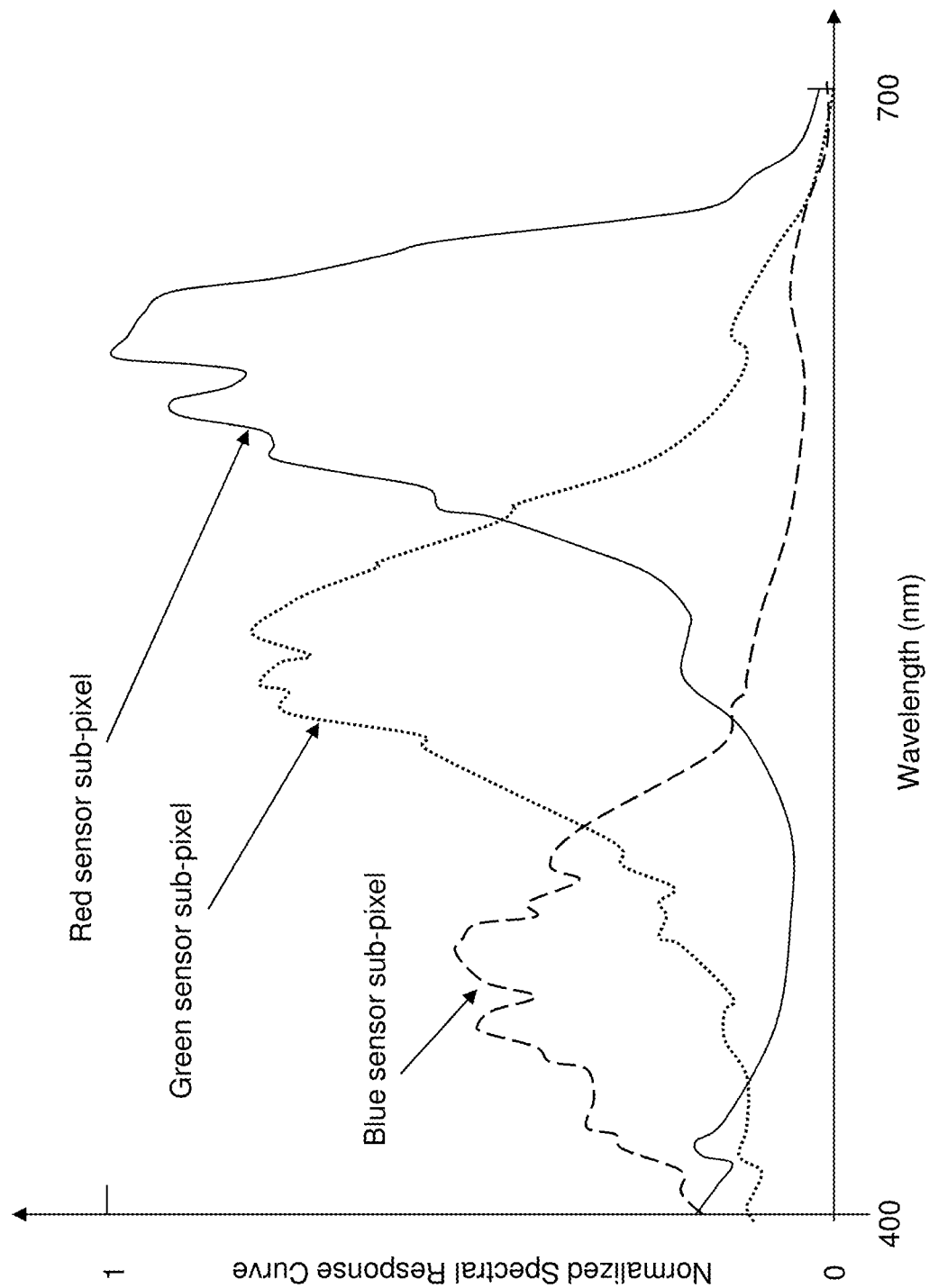
FIG. 9 illustrates exemplary measured spectral response curves from sensor pixels of an RGB image sensor.

FIG. 9 illustrates exemplary measured spectral response curves from a sensor pixel including three sub-pixels of an RGB image sensor. The measurement methods of the present disclosure were applied to generate a high resolution spectral response curve for a sensor pixel within the array of sensor pixels of the RGB image sensor. Each sensor pixel includes a red sensor sub-pixel, a green sensor sub-pixel, and a blue sensor sub-pixel.

Figure 10A:
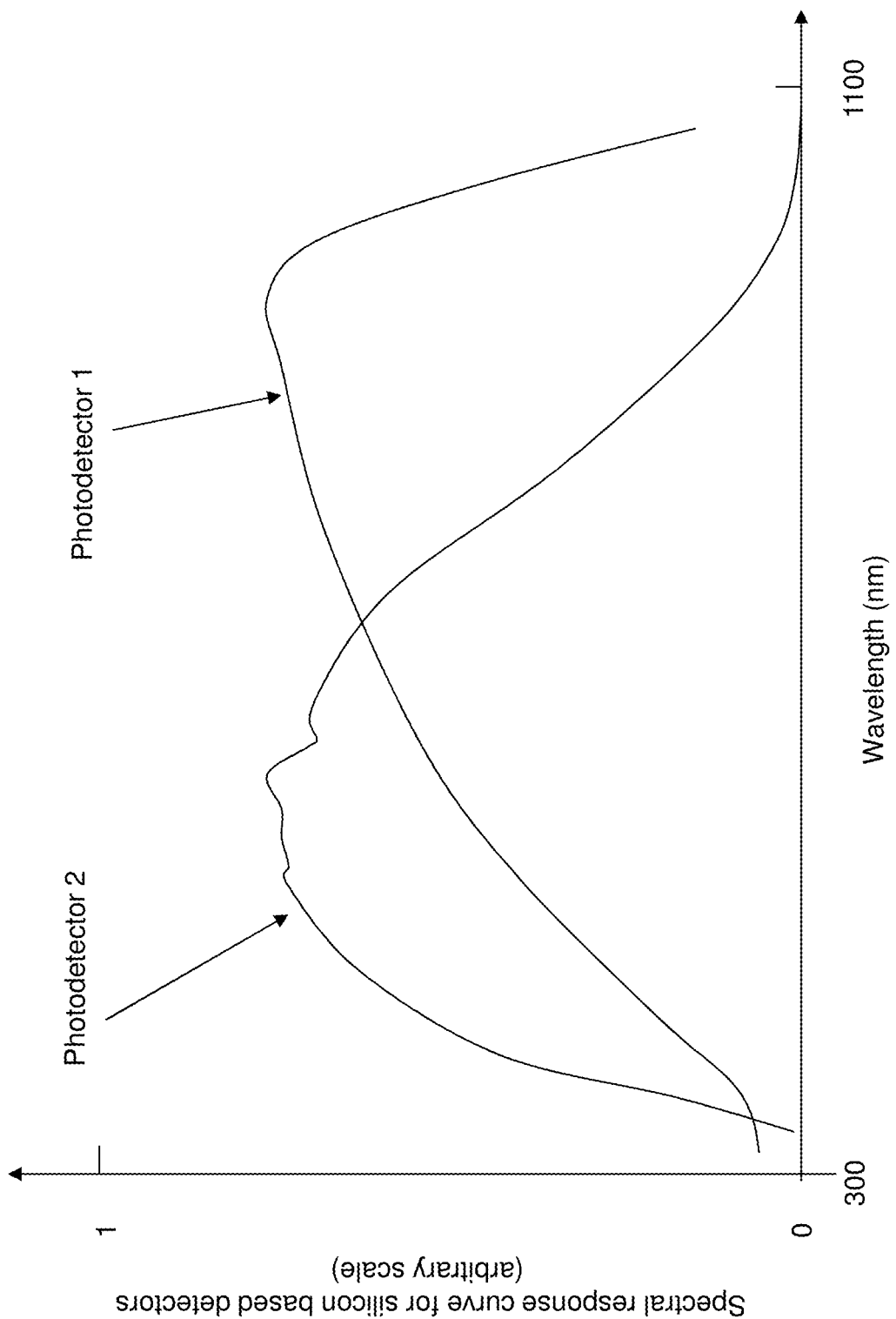
FIGS. 10A and 10B illustrate exemplary spectral response curves of various photodetectors when employed without any optical filter.
Figure 10B:
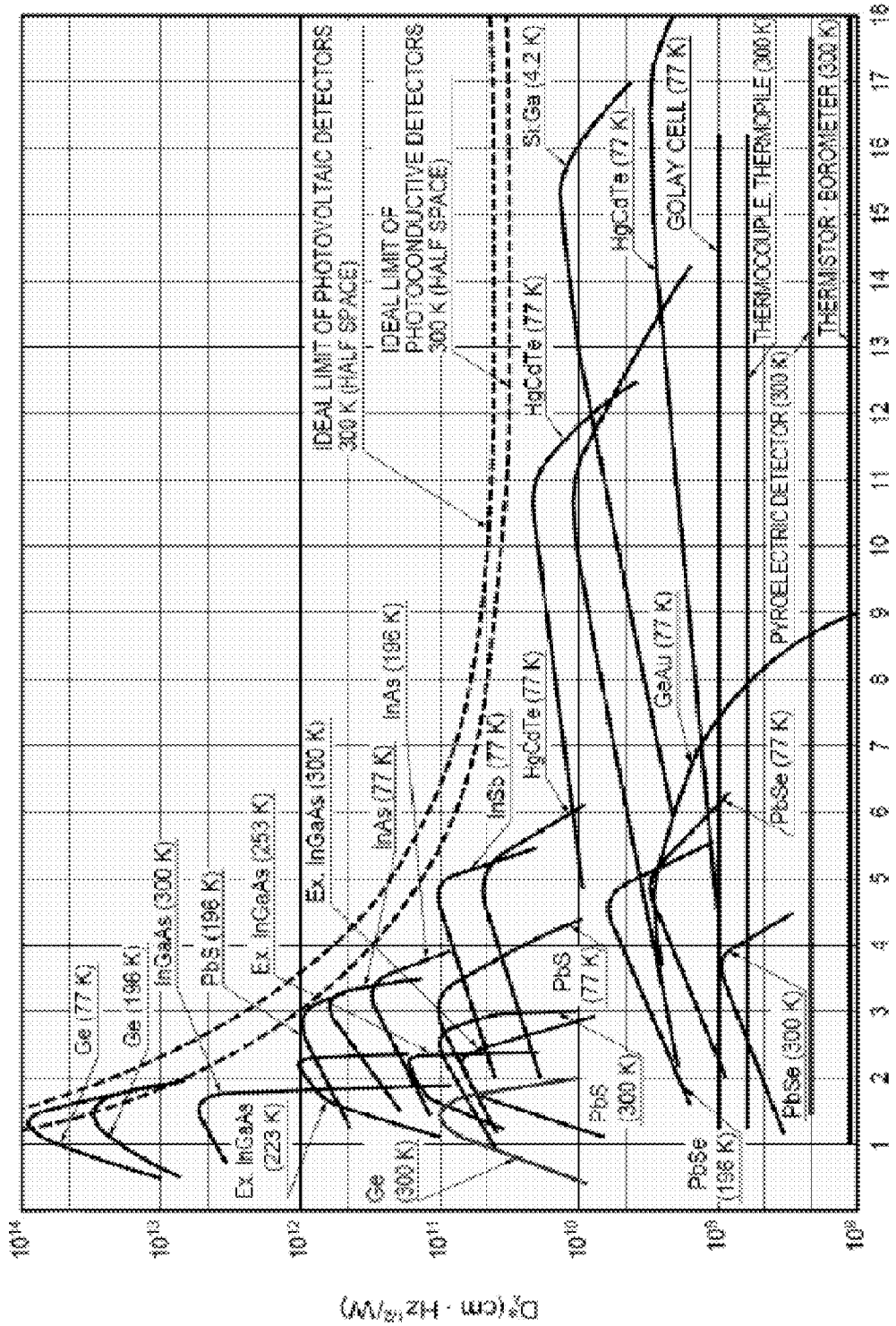

FIG. 10A illustrates spectral response curves of two commercially available silicon-based photodetectors when employed without any optical filter. FIG. 10B illustrates response curves of commercially available infrared photodetectors when employed without any optical filter.

Figure 11A:
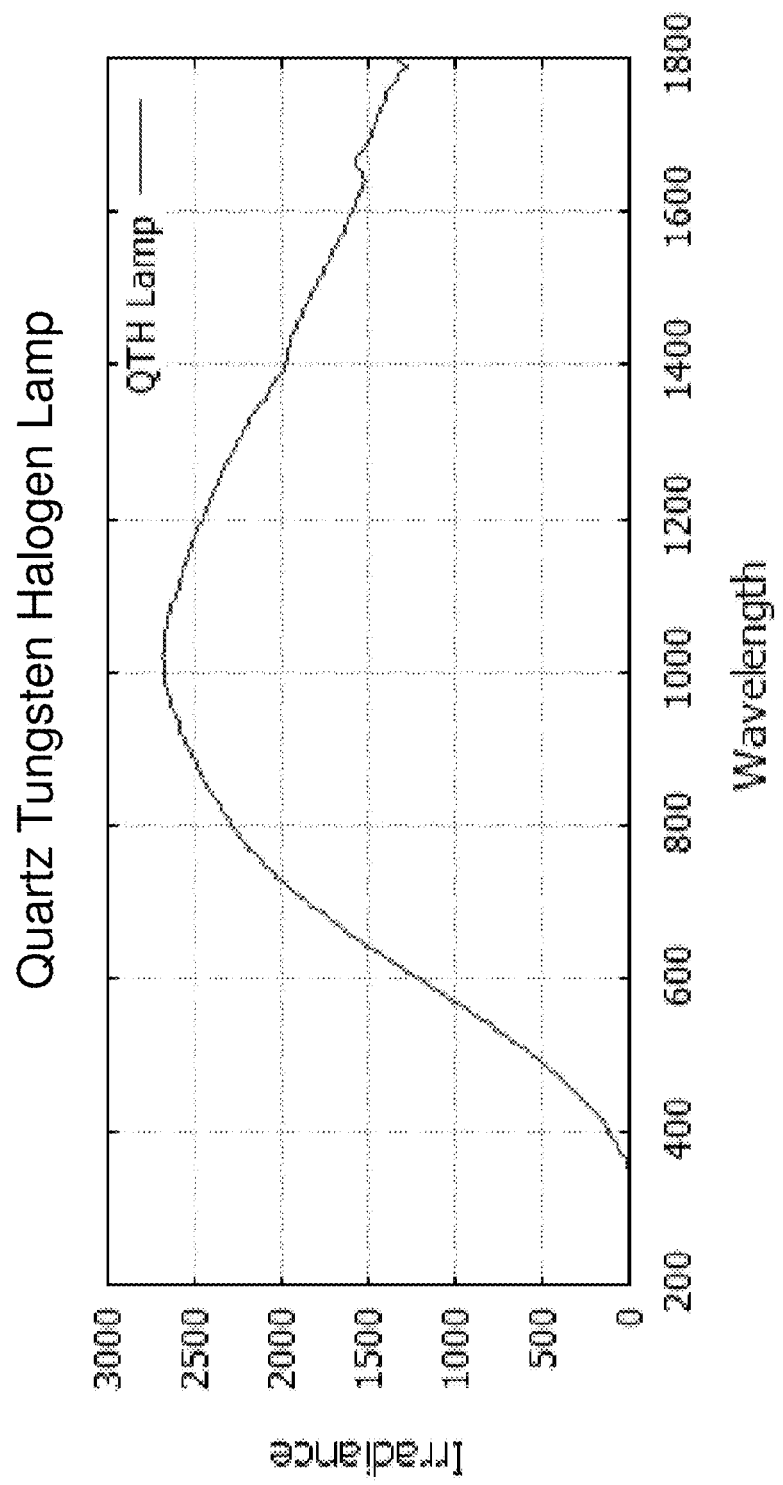
FIGS. 11A-11C illustrate emission spectra of various continuous light sources.
Figure 11B:
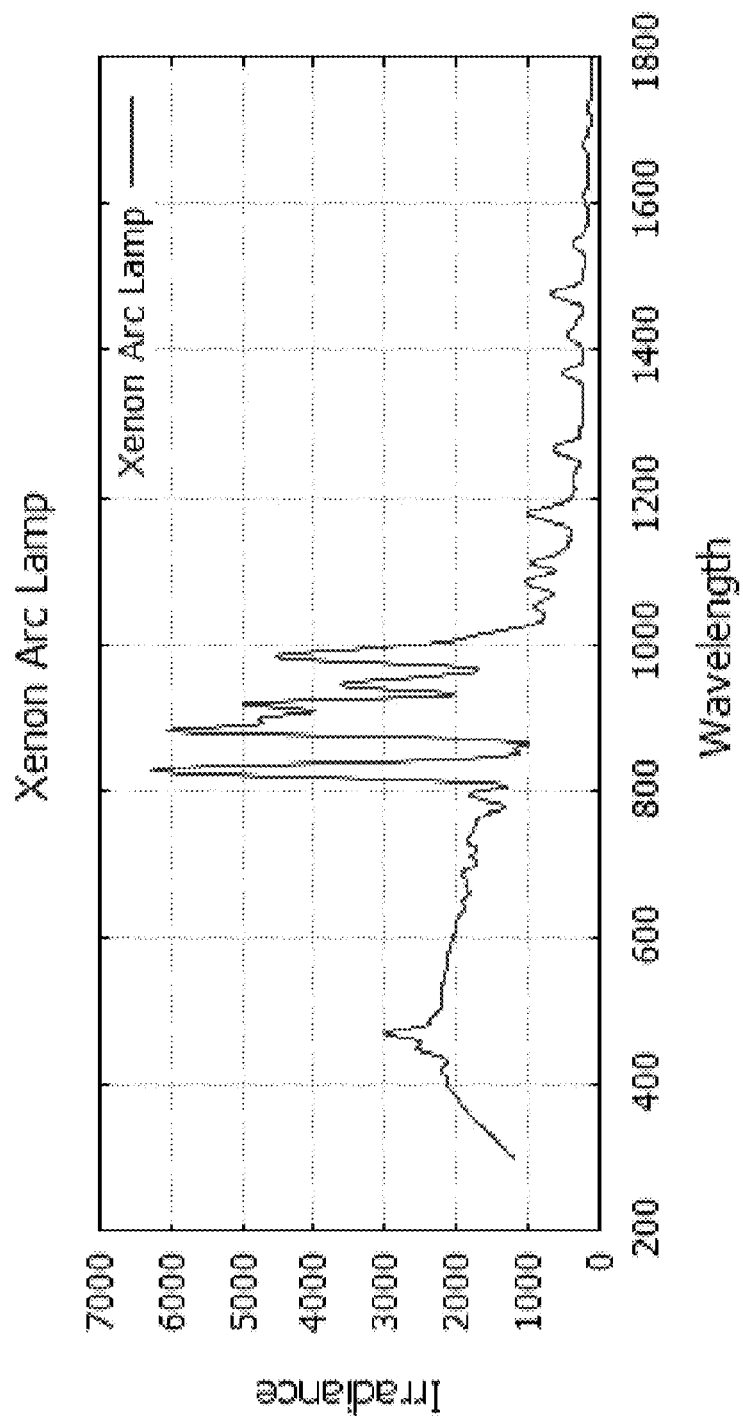
Figure 11C:
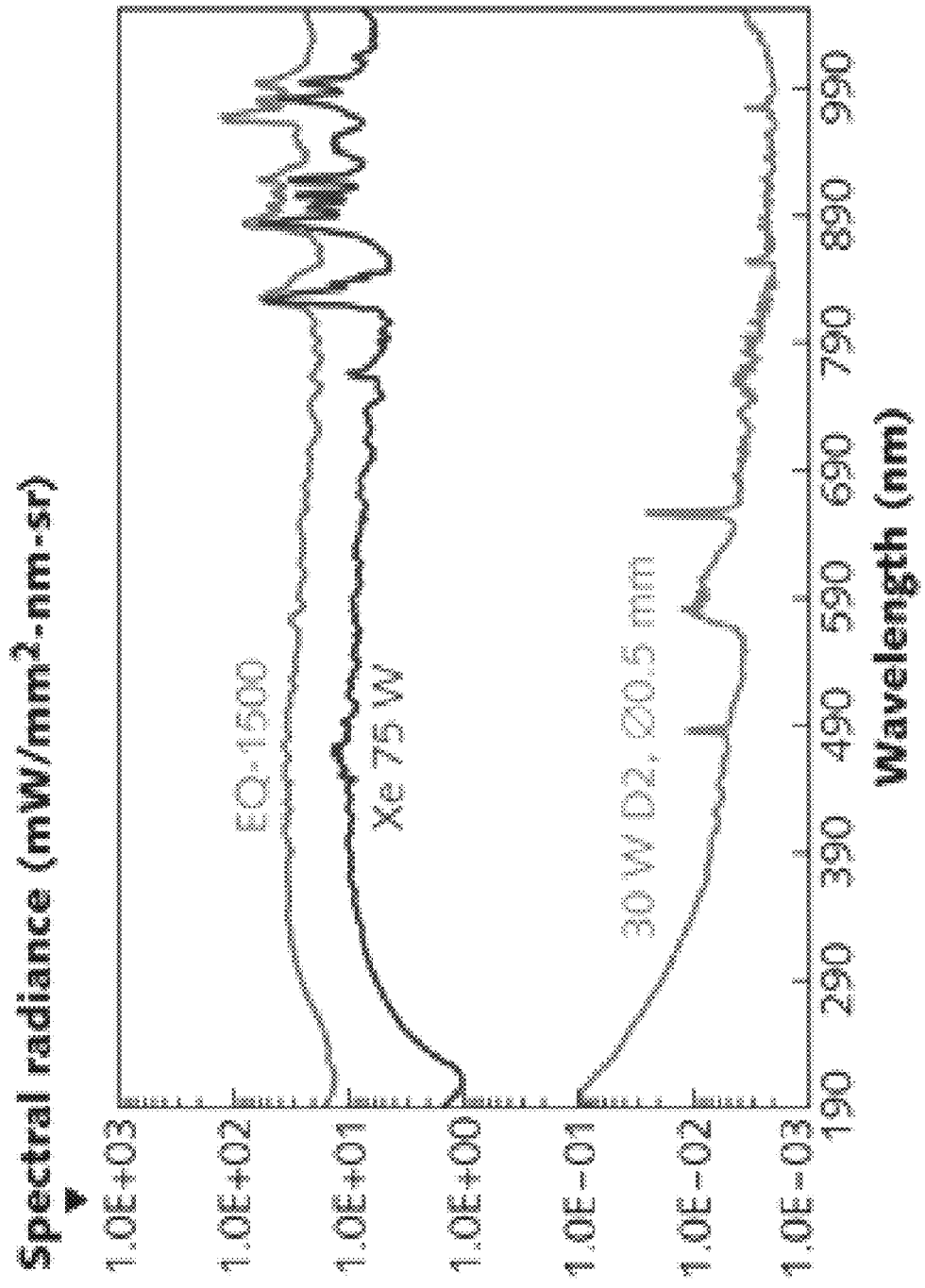

FIGS. 11A-11C illustrate emission spectra of various continuous light sources.

Referring collectively to all drawings of the instant application, embodiments of the present disclosure provide an apparatus for calibrating a plurality of optical sensors. The apparatus can include a platform 330 configured to carry a plurality of spectrum sensors 200 thereupon and to move along a movement direction; a light source 310 emitting a beam of continuous light spectra; and an optically dispersive element 320 located at a path of the beam of continuous light spectra and configured to generate spatially dispersed light spectra 324. A light source emitting a continuous light spectra is herein referred to as a continuous light source. Examples of a continuous light source include halogen light sources, xenon light sources, deuterium light sources, arc lamps, quartz tungsten halogen lamps, and lasers driven light sources, and infrared light sources. □□ Spatially separated light spectra are provided over an illuminated region of the platform. The spatially separated light spectra are the same as, or are derived through an optics system from, the spatially dispersed light spectra. Different areas of the illuminated region are illuminated with monochromatic light having different peak wavelengths.

In one embodiment, the spatially dispersed light spectra can be directed toward the platform 330 as the spatially separated light spectra 324, and the spatially separated light spectra 324 can have a continuously varying wavelength along a movement direction of the plurality of spectrum sensors 200 over the platform 330 as illustrated in FIG. 4. In one embodiment, the spatially separated light spectra provide a continuously varying wavelength along the movement direction.

In one embodiment, fiberglass optical cables 510 can be employed, which can be configured to guide segments of the spatially dispersed light spectra 322 to the illumination region so that exit ends of the fiberglass optical cables 510 are positioned over the platform 330 and are directed toward the plurality of spectrum sensors 200 as illustrated in FIG. 5. In one embodiment, an optically dispersive element 320 can be encased in an enclosure 390 including a plurality of openings 391 at locations to which the spatially dispersed light spectra 322 are directed. The fiberglass optical cables 510 can be optically coupled to a respective segment of the spatially dispersed light spectra 322 through the openings in the enclosure 390. In one embodiment, the spatially separated light spectra 324 may include at least one gap between the different areas of the illuminated region that is not illuminated by any light (for example, through an arrangement of the exit ends of the fiberglass optical cables 510).

The various methods and apparatus of the embodiments of the present disclosure can be employed to provide effective calibration of sensor pixels of spectrum sensors. At least 50%, and up to 100%, of all light spectra emitted from the light source 310 can be employed for calibration in contrast to prior sensor calibration apparatuses that utilizes only a selected single wavelength for a sensor calibration. Further, the continuous feeding and collecting of the spectrum sensors 200 provided by the present disclosure can increase the throughput of the sensor calibration operation at least by the total number of spectrum sensors 200 that can be simultaneously placed in the illumination region, which may be in a range from 30 to 300, although lesser and greater numbers can also be employed. Thus, significant improvement in the throughput of the calibration operation can be provided by the methods and apparatus of the present disclosure.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of simultaneously measuring spectral responses of a plurality of optical sensors, comprising:
   placing a plurality of optical sensors on a platform, each of the plurality of optical sensors including a plurality of sensor pixels;
   providing spatially separated light spectra over an illuminated region of the platform, wherein different areas of the illuminated region are illuminated with different monochromatic lights having different peak wavelengths;
   moving the plurality of optical sensors with the platform through the illuminated region; and
   measuring spectral responses of at least one sensor pixel within each of the plurality of optical sensors during transit through the illuminated region,
   wherein the spatially separated light spectra are generated at least by:
      generating a collimated light from a continuous light source; and
      generating spatially dispersed light spectra employing an optically dispersive element, wherein the spatially separated light spectra are provided from respective segments of the spatially dispersed light spectra.

2. The method of claim 1, wherein:
   the spatially dispersed light spectra is directed toward the platform as the spatially separated light spectra; and
   the spatially separated light spectra have a continuously varying wavelength along a movement direction of the plurality of optical sensors over the platform.

3. The method of claim 1, further comprising guiding segments of the spatially dispersed light spectra through fiberglass optical cables so that exit ends of the fiberglass optical cables are positioned over the platform and are directed toward the plurality of optical sensors.

4. The method of claim 3, wherein:
   the optically dispersive element is encased in an enclosure including a plurality of openings at locations to which the spatially dispersed light spectra are directed, and
   the fiberglass optical cables are optically coupled to a respective segment of the spatially dispersed light spectra through the openings in the enclosure.

5. A method of simultaneously measuring spectral responses of a plurality of optical sensors, comprising:
   placing a plurality of optical sensors on a platform, each of the plurality of optical sensors including a plurality of sensor pixels;
   providing spatially separated light spectra over an illuminated region of the platform, wherein different areas of the illuminated region are illuminated with different monochromatic lights having different peak wavelengths;
   moving the plurality of optical sensors with the platform through the illuminated region;
   measuring spectral responses of at least one sensor pixel within each of the plurality of optical sensors during transit through the illuminated region; and
   synchronizing a wavelength counter for each optical sensor and a wavelength of an illuminating spectrum among the spatially separated light spectra while the plurality of optical sensors move through the illumination region by providing a uniform speed of movement and a uniform time interval of stop for the plurality of optical sensors and by resetting a clock for each of the plurality of optical sensors at a time of transit through a fixed point before the illumination region;
   wherein:
   each of the optical sensors comprises a single pixel optical detector, a one dimensional array of sensor pixels, a two-dimensional array of sensor pixels, an image sensor, or a spectrum sensor;
   each sensor pixel in each optical sensor comprises a stack of a photodetector and an optical filter having a respective transmissivity curve as a function of wavelength;
   each optical filter is a plasmonic filter;
   the array of sensor pixels is arranged as a rectangular M×N array of sensor pixels;
   M is an integer greater than 3; and
   N is an integer greater than 3.

6. A method of simultaneously measuring spectral responses of a plurality of optical sensors, comprising:
   placing a plurality of optical sensors on a platform, each of the plurality of optical sensors including a plurality of sensor pixels;
   providing spatially separated light spectra over an illuminated region of the platform, wherein different areas of the illuminated region are illuminated with different monochromatic lights having different peak wavelengths;
   moving the plurality of optical sensors with the platform through the illuminated region;
   measuring spectral responses of at least one sensor pixel within each of the plurality of optical sensors during transit through the illuminated region, wherein: each of the optical sensors comprises a single pixel optical detector, a one dimensional array of sensor pixels, a two-dimensional array of sensor pixels, an image sensor, or a spectrum sensor; and each sensor pixel in each optical sensor comprises a stack of a photodetector and an optical filter having a respective transmissivity curve as a function of wavelength; and measuring, for each optical sensor among the plurality of spectrum sensors, a spectral response curve for each sensor pixel within the array of sensor pixels as a function of wavelength while the respective optical sensor moves through the illuminated region.

7. The method of claim 6, further comprising, for each optical sensor among the plurality of optical sensors, storing the spectral response curves for each sensor pixel in a data storage unit through signal connections including a sensor mount socket and data transmission hardware.

8. A method of simultaneously measuring spectral responses of a plurality of optical sensors, comprising:
   placing a plurality of optical sensors on a platform, each of the plurality of optical sensors including a plurality of sensor pixels;
   providing spatially separated light spectra over an illuminated region of the platform, wherein different areas of the illuminated region are illuminated with different monochromatic lights having different peak wavelengths;
   moving the plurality of optical sensors with the platform through the illuminated region; and
   measuring spectral responses of at least one sensor pixel within each of the plurality of optical sensors during transit through the illuminated region;
   wherein
   the platform comprises a conveyor belt configured to provide a movement along a movement direction; and
   the method further comprises:
      continuously providing additional optical sensors at a feeding end of the conveyor belt and collecting the plurality of optical sensors at a collecting end of the conveyor belt; and
      monitoring stability of a light source by monitoring reproducibility of spectral response curves of reference sensors that are repeatedly placed on the platform.

9. An apparatus for calibrating a plurality of optical sensors, comprising:
   a platform configured to carry a plurality of optical sensors thereupon and to move along a movement direction;
   a light source emitting a beam of continuous light spectra; and
   an optically dispersive element located at a path of the beam of continuous light spectra and configured to generate spatially dispersed light spectra,
   wherein:
   spatially separated light spectra are provided over an illuminated region of the platform;
   the spatially separated light spectra are the same as, or are derived through an optics system from, the spatially dispersed light spectra;
   different areas of the illuminated region are illuminated with different monochromatic lights having different peak wavelengths;
   fiberglass optical cables configured to guide segments of the spatially dispersed light spectra to the illumination region so that exit ends of the fiberglass optical cables are positioned over the platform and are directed toward the plurality of spectrum sensors; and
   at least one power attenuation devices located at an exit end of a respective one of the fiberglass optical cables.

10. The apparatus of claim 9, wherein:
   the optically dispersive element is encased in an enclosure including a plurality of openings at locations to which the spatially dispersed light spectra are directed, and
   the fiberglass optical cables are optically coupled to a respective segment of the spatially dispersed light spectra through the openings in the enclosure.

\* \* \* \* \*